(12) United States Patent
Nishio

(10) Patent No.: US 6,462,885 B2
(45) Date of Patent: Oct. 8, 2002

(54) ZOOM LENS AND PHOTOGRAPHING APPARATUS HAVING THE SAME

(75) Inventor: Akihiro Nishio, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 09/729,823

(22) Filed: Dec. 6, 2000

(65) Prior Publication Data

US 2001/0022696 A1 Sep. 20, 2001

(30) Foreign Application Priority Data

Dec. 10, 1999 (JP) ............................................. 11-351518

(51) Int. Cl.⁷ ........................ G02B 15/14; G02B 15/15; G02B 27/64
(52) U.S. Cl. ........................ 359/687; 359/677; 359/557
(58) Field of Search ................................. 359/687, 677, 359/557

(56) References Cited

U.S. PATENT DOCUMENTS

| | | | |
|---|---|---|---|
| 5,056,900 A | 10/1991 | Mukaiya et al. | 359/676 |
| 5,132,848 A | 7/1992 | Nishio et al. | 359/686 |
| 5,221,994 A | 6/1993 | Nishio | 359/684 |
| 5,253,113 A | 10/1993 | Sekita et al. | 359/680 |
| 5,523,888 A | 6/1996 | Nishio | 359/686 |
| 5,574,599 A | 11/1996 | Hoshi et al. | 359/689 |
| 5,585,966 A | 12/1996 | Suzuki | 359/557 |
| 5,638,216 A | 6/1997 | Horiuchi et al. | 359/683 |
| 5,691,851 A | 11/1997 | Nishio et al. | 359/683 |
| 5,815,320 A | 9/1998 | Hoshi et al. | 359/686 |
| 5,831,772 A | 11/1998 | Nishio et al. | 359/689 |
| 6,028,716 A | 2/2000 | Kato et al. | 359/689 |
| 6,046,852 A | 4/2000 | Konno et al. | 359/557 |
| 6,061,180 A * | 5/2000 | Hayakawa | 359/557 |
| 6,061,186 A | 5/2000 | Nishio | 359/684 |
| 6,115,188 A | 9/2000 | Nishio | 359/690 |
| 6,141,159 A | 10/2000 | Nishio | 359/793 |

FOREIGN PATENT DOCUMENTS

| | | |
|---|---|---|
| JP | 7-128619 | 5/1995 |
| JP | 7-199124 | 8/1995 |
| JP | 9-230236 | 9/1997 |
| JP | 10-232420 | 9/1998 |

\* cited by examiner

Primary Examiner—Georgia Epps
Assistant Examiner—David N. Spector
(74) Attorney, Agent, or Firm—Fitzpatrick, Cella, Harper & Scinto

(57) ABSTRACT

A zoom lens includes a first lens unit with a positive refractive power, a second lens unit with a negative refractive power, a third lens unit with a positive refractive power, and a fourth lens unit with a positive refractive power, which are arranged in this order from an object side. At least the first, third and fourth lens units are moved along an optical axis to vary spatial distances of the lens units to thereby change the magnification of the zoom lens. The third lens unit includes a first lens subunit with a positive refractive power, and a second lens subunit with a negative refractive power, and the second lens subunit is moved to have at least a perpendicular vector component with respect to the optical axis to thereby displace an image.

16 Claims, 16 Drawing Sheets

ZOOM LENS AND PHOTOGRAPHING APPARATUS HAVING THE SAME

BACKGROUND OF THE INVENTION

1. Field of the Invention

The present invention relates to a zoom lens having fluctuation prevention function and a photographing apparatus provided with the zoom lens. In particular, the present invention relates to a zoom lens having fluctuation prevention function and a photographing apparatus, which can be preferably applied to a still camera, a video camera, a digital camera, etc., and which is designed to allow a lens group, i.e., a part of the zoom lens, to be moved in a direction perpendicular to an optical axis so as to optically correct a blur of a photographed still image caused by the fluctuating motion (inclined motion) of the zoom lens due to hand fluctuation or the like, thereby obtaining a stabilized photographed image.

2. Related Background Art

Blur is caused on a photographed image due to hand fluctuation transmitted to a photographing system. Various attempts have been made to provide fluctuation preventive optical systems that can prevent the blur on the photographed image.

Recently, for a still camera, a video camera, a digital camera, etc., a zoom lens having fluctuation prevention function has been required to correct the image blur caused due to hand fluctuation or the like for the purpose of obtaining a higher quality image and enlarging applicable photographing conditions.

As a zoom lens having fluctuation prevention function, for example, Japanese Patent Application Laid-Open No. 9-230236 discloses a four-lens-group zoom lens in which positive, negative, positive and positive refractive power lens groups are arranged in this order from an object side, and in which the third lens group is divided into a positive refractive power front lens group and a positive refractive power rear lens group, and the rear lens group is moved perpendicularly to an optical axis to correct the image blur. Japanese Patent Application Laid-Open No. 10-232420 discloses a four-lens-group zoom lens, primarily applied to a video camera, in which positive, negative, positive and positive refractive power lens groups are arranged with the first and third lens groups to be fixed, and in which the third lens group is divided into a positive refractive power lens group and a negative refractive power lens group, and either one of these lens groups is moved in a direction perpendicular to an optical axis to correct image blur.

Japanese Patent Application Laid-Open No. 7-128619 discloses a magnification changeable optical system having four lens groups, which is provided, sequentially from an object side, with a first group having a positive refractive power fixed during the change of magnification and the in-focusing condition, a second group with a negative refractive power, having a magnification changing function, an aperture diaphragm, a third group with a positive refractive power, and a fourth group with a positive refractive power, that has both correction a function for correcting an image plane that varies depending on the change of magnification, and an in-focusing function. In the system, the third group is constructed of two lens groups, i.e., a third-1 group with a negative refractive power, and a third-2 group with a positive refractive power, and the third-2 group is moved in a direction perpendicular to an optical axis to correct blur of the photographed image caused by fluctuation of the magnification changeable optical system.

Japanese Patent Application Laid-Open No. 7-199124 discloses a magnification changeable optical system constructed of four groups, i.e., positive, negative, positive and positive refractive power lens groups, in which the third lens group entirely is fluctuated perpendicularly to an optical axis for the purpose of fluctuation prevention.

In general, an optical system, which is designed to parallell offset a part of lens of a photographing system in a direction perpendicular to an optical axis to correct the image blur, can advantageously realize the correction of the image blur in a relatively simple fashion, but requires driving means for driving the lens to be moved. Further, the system provides the result in an increased amount of offset aberration occurring during fluctuation prevention.

For example, if a correction lens group for correcting the image blur is large in its number of constituting lenses and weight, a large torque is required when electrically driving the same. Further, if the correction lens group for correcting the image blur is set inappropriately, the correction optical system requires a large amount of its movement in order to obtain an image-blur correcting effect of a certain degree, making the entire optical system large in size.

SUMMARY OF THE INVENTION

An object of the present invention is to provide a zoom lens and a photographing apparatus using the zoom lens, in which a relatively small and light-weight lens group forming a part of the zoom lens is moved in a direction perpendicular to an optical axis to correct image blur due to fluctuation (inclination) of the zoom lens, and in which the lens arrangement for the zoom lens is optimized to realize a zoom lens that is compact in size, has a simple mechanism, is small in the load applied to driving means, and that can effectively correct certain image blurring with a small amount of displacement of the lens group.

To attain the above-noted object, the present invention provides, as one form thereof, a zoom lens which includes:

a first lens unit with a positive refractive power;

a second lens unit with a negative refractive power;

a third lens unit with a positive refractive power; and a fourth lens unit with a positive refractive power, in which at least the first, third and fourth lens units are moved along an optical axis to vary spatial distances of the lens units to thereby the change magnification, and the third lens unit includes a first lens subunit with a positive refractive power, and a second lens subunit with a negative refractive power, and the second lens subunit is moved to have at least a perpendicular vector component with respect to the optical axis to thereby displace an image.

As a preferable form, the following conditions are satisfied:

$$0.35 < F3/Fm < 1$$

$$-0.9 < F3/F32 < -0.18$$

where focal lengths of the entire system at a wide angle end and a telephoto end are respectively represented by Fw and Ft, the focal length of the third lens unit is represented by F3, the focal length of the second lens subunit is represented by F32, and $Fm = (Fw \times Ft)^{1/2}$.

As a preferable form, the second lens subunit is moved to have a perpendicular vector component with respect to the optical axis to thereby correct image blur caused by fluctuation of the zoom lens.

As a preferable form, the following condition is satisfied:

$$-0.2 < (Ra+Rb)/(Ra-Rb) < 0.7$$

where the radius of curvature of a lens plane located closest to an image plane side within the first lens subunit is represented by Ra, and the radius of curvature of a lens plane located closest to the object side within the second lens subunit is represented by Rb.

As a preferable form, the following conditions are satisfied:

$$0.7 < F1/Fm < 2.8$$

$$0.15 < |F2/Fm| < 0.7$$

$$0.5 < F4/Fm < 2.0$$

where the focal length of an i-th lens unit of the lens units is represented by Fi.

As a preferable form, the second lens subunit includes one positive lens and one negative lens.

As a preferable form, the first lens subunit includes, from the object side, a composite lens with a positive refractive power, in which a meniscus-like negative lens having a concave surface on an image plane side is adhered to a positive lens, and a composite lens with a positive single lens or a positive refractive power, in which a positive lens is adhered to a negative lens.

As a preferable form, the second lens subunit includes a composite lens with a negative refractive power, in which a positive lens having a convex surface oriented to an image plane side is adhered to a negative lens having a concave surface oriented to the object side.

As a preferable form, the third lens unit further includes a third lens subunit having a negative or positive refractive power on an image plane side of the second lens subunit.

To attain the above-noted object, the present invention provides, as another form, a photographing apparatus which includes:

a first lens unit with a positive refractive power;
a second lens unit with a negative refractive power;
a third lens unit with a positive refractive power;
a fourth lens unit with a positive refractive power; and
a casing holding a zoom lens, in which at least the first, third and fourth lens units are moved along an optical axis to vary spatial distances of the lens units to thereby change the magnification, and the third lens unit includes a first lens subunit with a positive refractive power, and a second lens subunit with a negative refractive power, and the second lens subunit is moved to have at least a perpendicular vector component with respect to the optical axis to thereby displace an image.

As a preferable form, the following conditions are satisfied:

$$0.35 < F3/Fm < 1$$

$$-0.9 < F3/F32 < -0.18$$

where the focal lengths of the entire system at a wide angle end and a telephoto end are respectively represented by Fw and Ft, the focal length of the third lens unit is represented by F3, the focal length of the second lens subunit is represented by F32, and $Fm = (Fw \times Ft)^{1/2}$.

As a preferable form, the second lens subunit is moved to have a perpendicular vector component with respect to the optical axis to thereby correct image blur caused due to fluctuation of the zoom lens.

As a preferable form, the following condition is satisfied:

$$-0.2 < (Ra+Rb)/(Ra-Rb) < 0.7$$

where the radius of curvature of a lens plane located closest to an image plane side within the first lens subunit is represented by Ra, and the radius of curvature of a lens plane located closest to the object side within the second lens subunit is represented by Rb.

As a preferable form, the following conditions are satisfied:

$$0.7 < F1/Fm < 2.8$$

$$0.15 < |F2/Fm| < 0.7$$

$$0.5 < F4/Fm < 2.0$$

where the focal length of an i-th lens unit of the lens units is represented by Fi.

DESCRIPTION OF THE PREFERRED EMBODIMENTS

Figure 2:
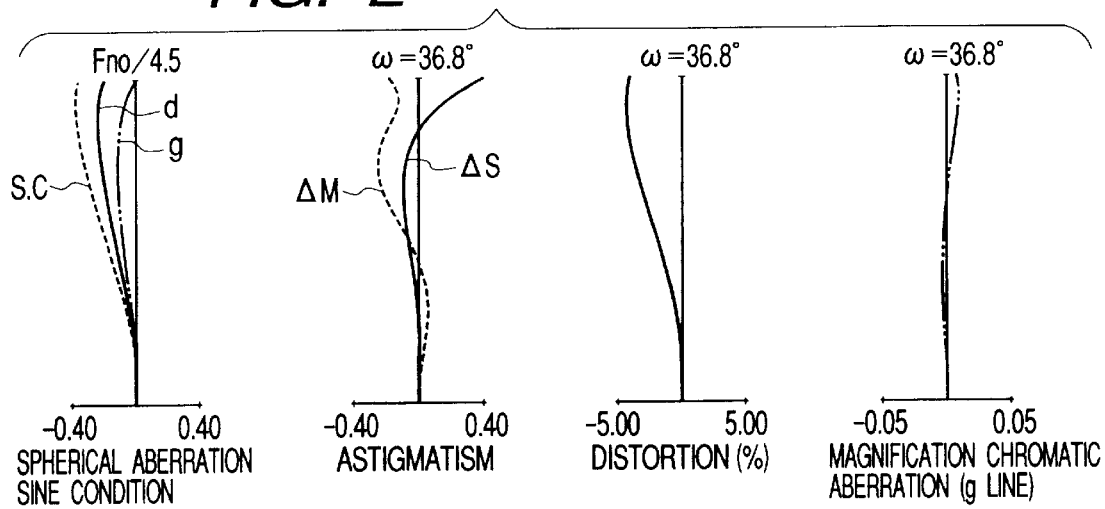
FIG. 2 is a view showing aberration at the wide angle end under a normal condition according to the numerical first embodiment of the present invention.
Figure 3:
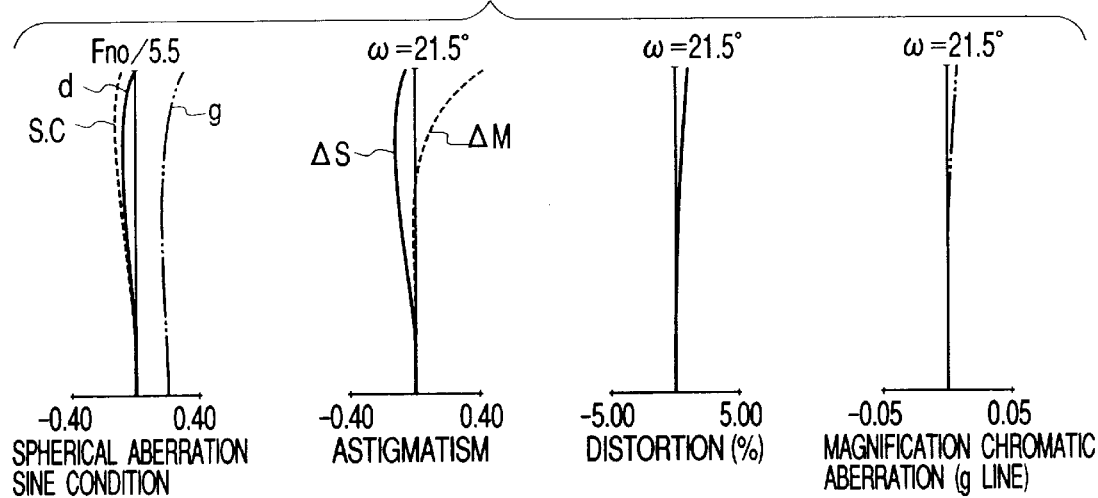
FIG. 3 is a view showing aberration at a middle under a normal condition according to the numerical first embodiment of the present invention.
Figure 4:
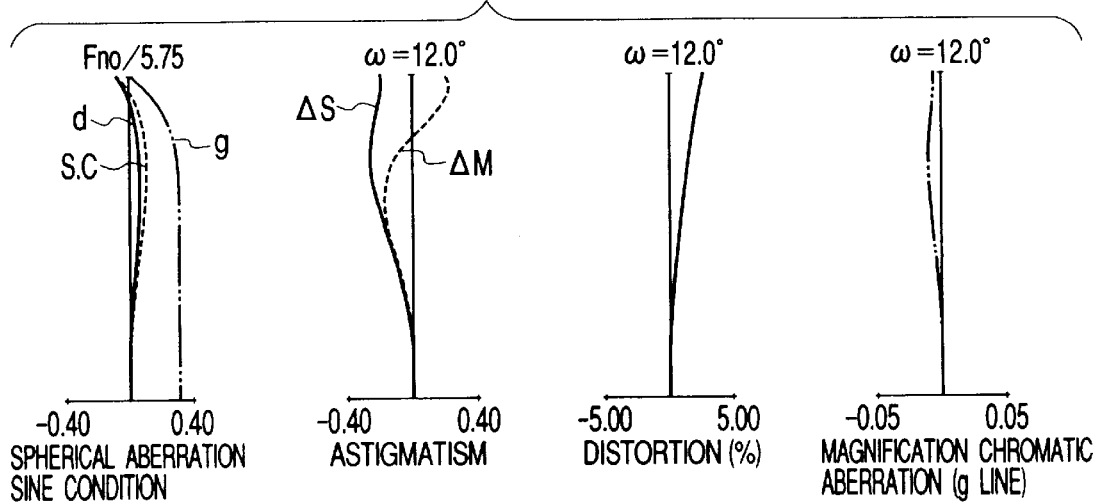
FIG. 4 is a view showing aberration at a telephoto end under a normal condition according to the numerical first embodiment of the present invention.
Figure 5:
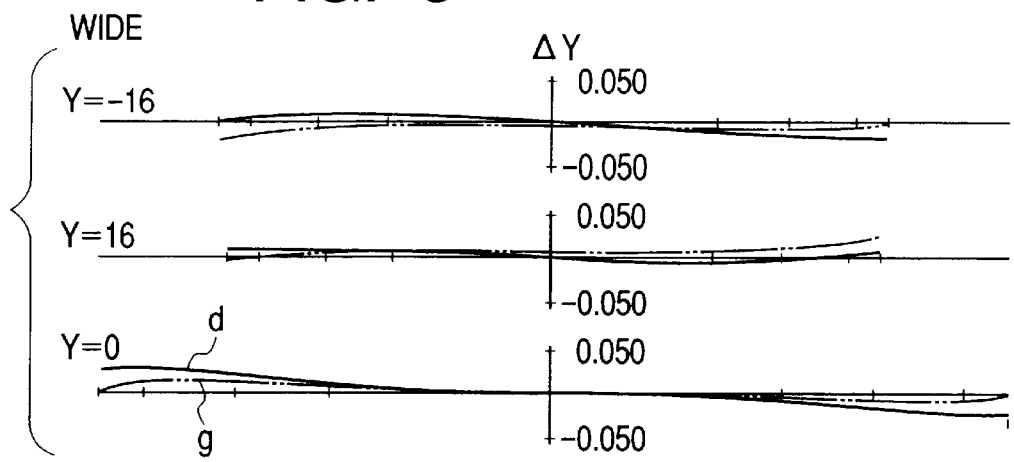
FIG. 5 is a view showing aberration at the wide angle end with correction for image blur corresponding to an 0.3 degree field angle according to the numerical first embodiment of the present invention.
Figure 6:
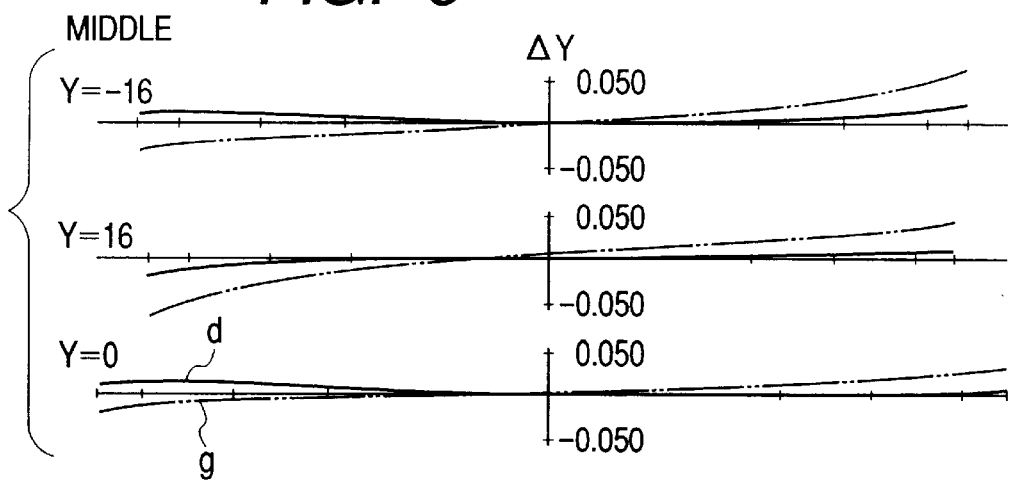
FIG. 6 is a view showing aberration at the middle with correction for image blur corresponding to a 0.3 degree field angle according to the numerical first embodiment of the present invention.
Figure 7:
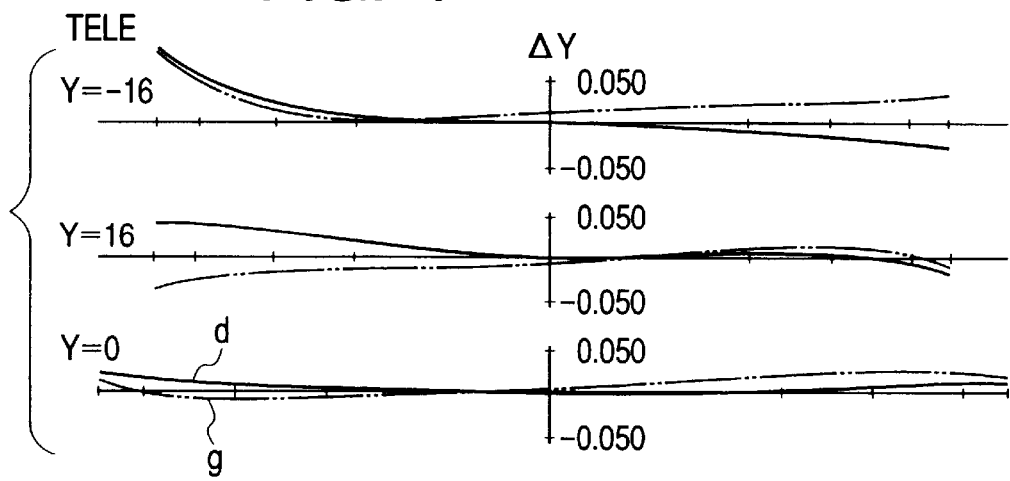
FIG. 7 is a view showing aberration at the telephoto end with correction for image blur corresponding to a 0.3 degree field angle according to the numerical first embodiment of the present invention.
Figure 9:
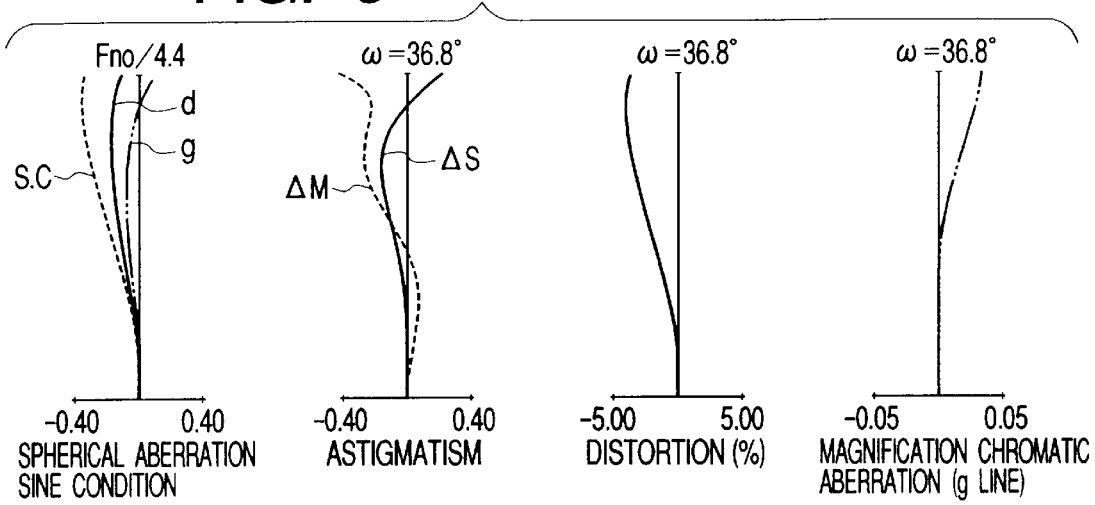
FIG. 9 is a view showing aberration at the wide angle end under a normal condition according to the numerical second embodiment of the present invention.
Figure 10:
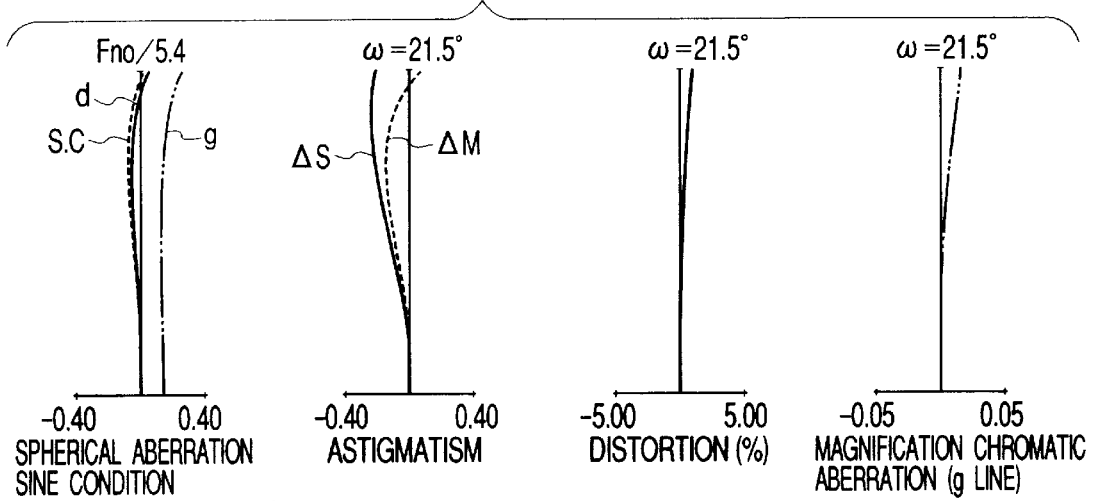
FIG. 10 is a view showing aberration at a middle under a normal condition according to the numerical second embodiment of the present invention.
Figure 11:
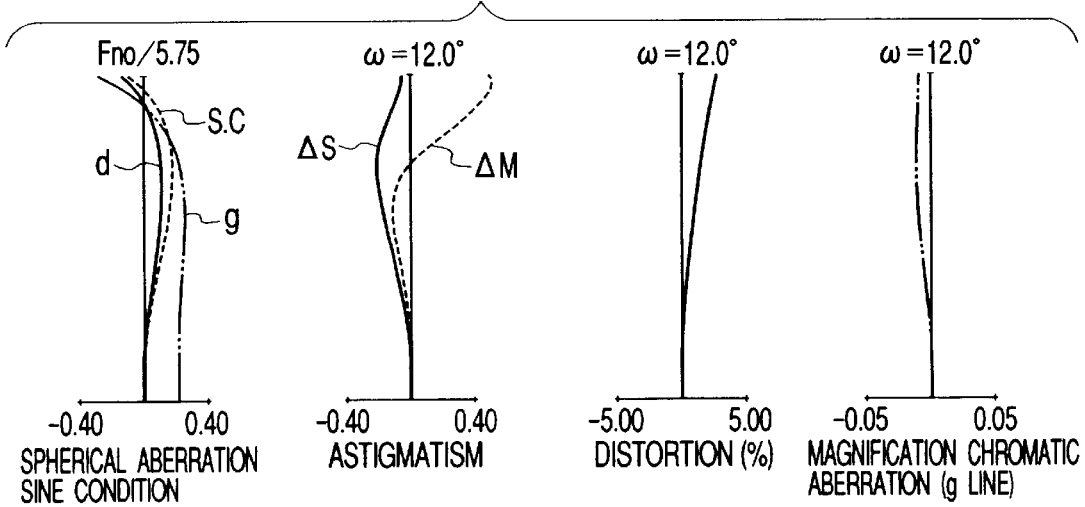
FIG. 11 is a view showing aberration at a telephoto end under a normal condition according to the numerical second embodiment of the present invention.
Figure 12:
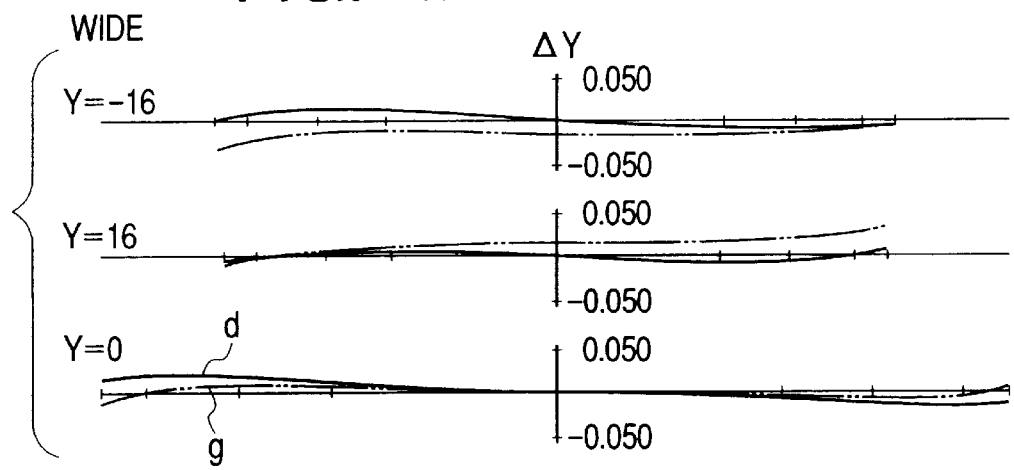
FIG. 12 is a view showing aberration at the wide angle end with correction for an image blur corresponding to a 0.3 degree field angle according to the numerical second embodiment of the present invention.
Figure 13:
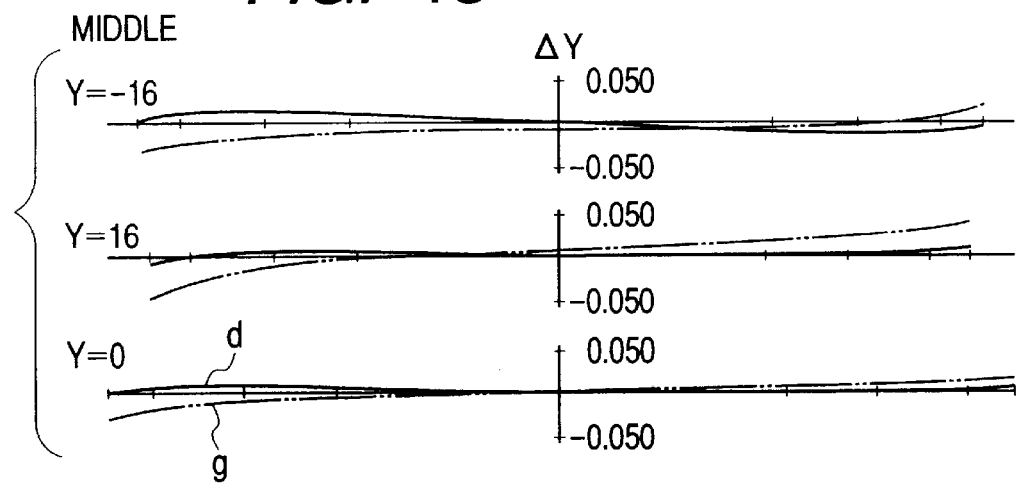
FIG. 13 is a view showing aberration at the middle with correction for an image blur corresponding to a 0.3 degree field angle according to the numerical second embodiment of the present invention.
Figure 14:
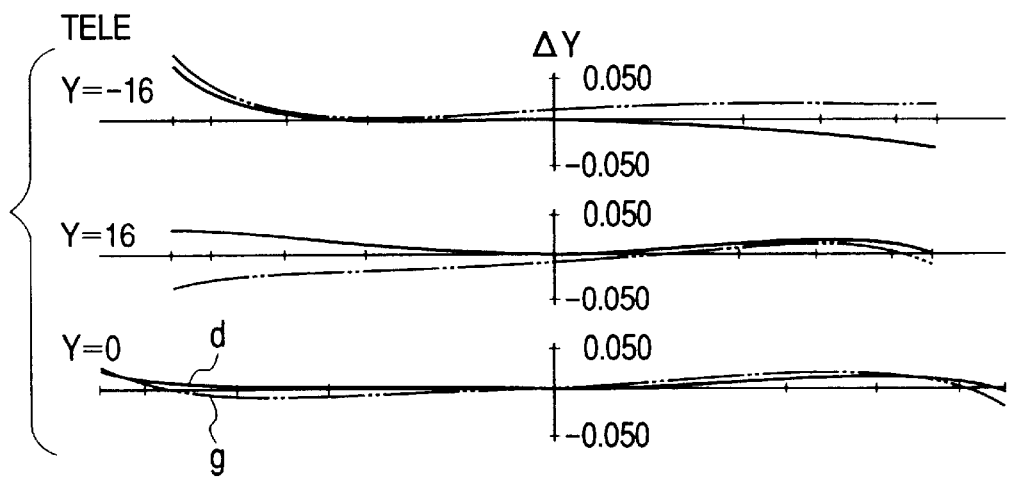
FIG. 14 is a view showing aberration at the telephoto end with correction for an image blur corresponding to a 0.3 degree field angle according to the numerical second embodiment of the present invention.
Figure 16:
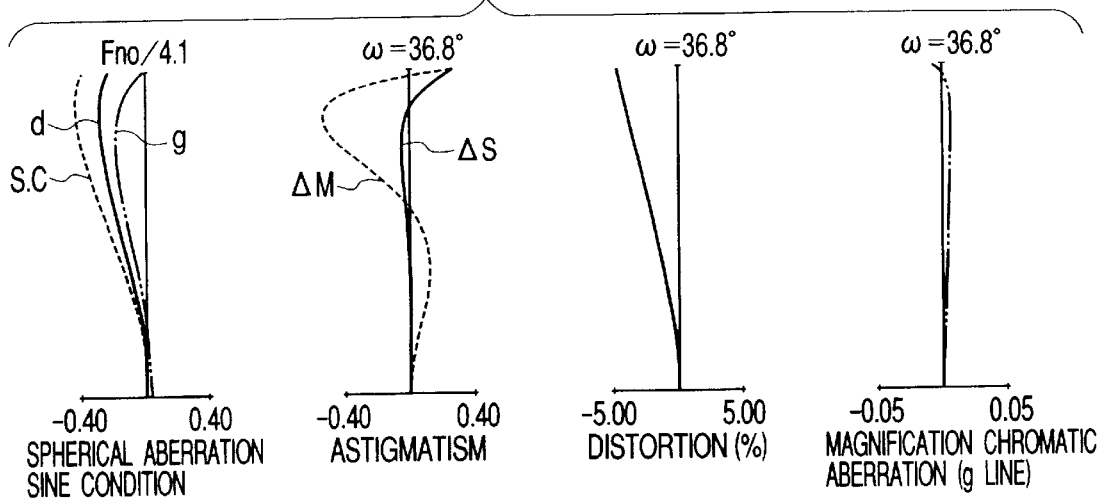
FIG. 16 is a view showing aberration at the wide angle end under a normal condition according to the numerical third embodiment of the present invention.
Figure 17:
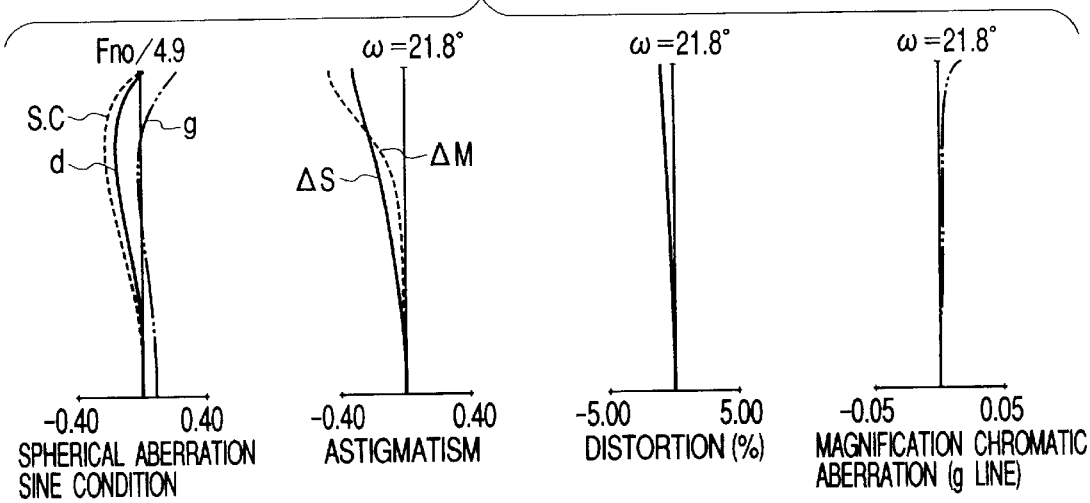
FIG. 17 is a view showing aberration at the middle under a normal condition according to the numerical third embodiment of the present invention.
Figure 18:
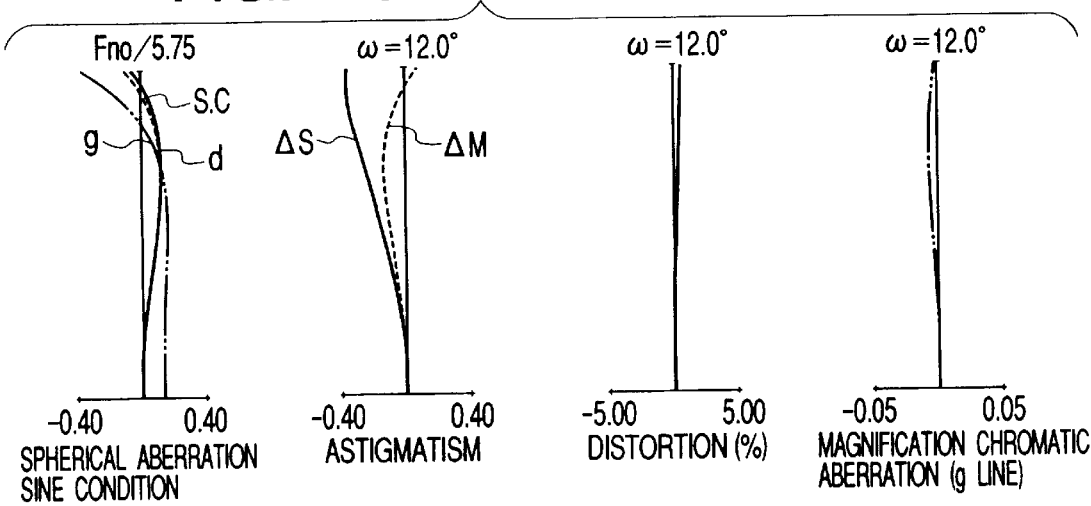
FIG. 18 is a view showing aberration at a telephoto end under a normal condition according to the numerical third embodiment of the present invention.
Figure 19:
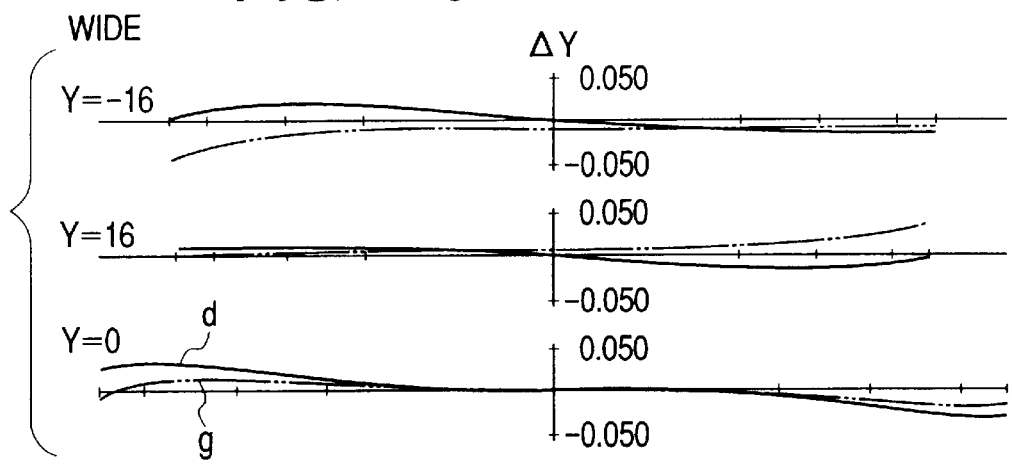
FIG. 19 is a view showing aberration at the wide angle end with correction for an image blur corresponding to a 0.3 degree field angle according to the numerical third embodiment of the present invention.
Figure 20:
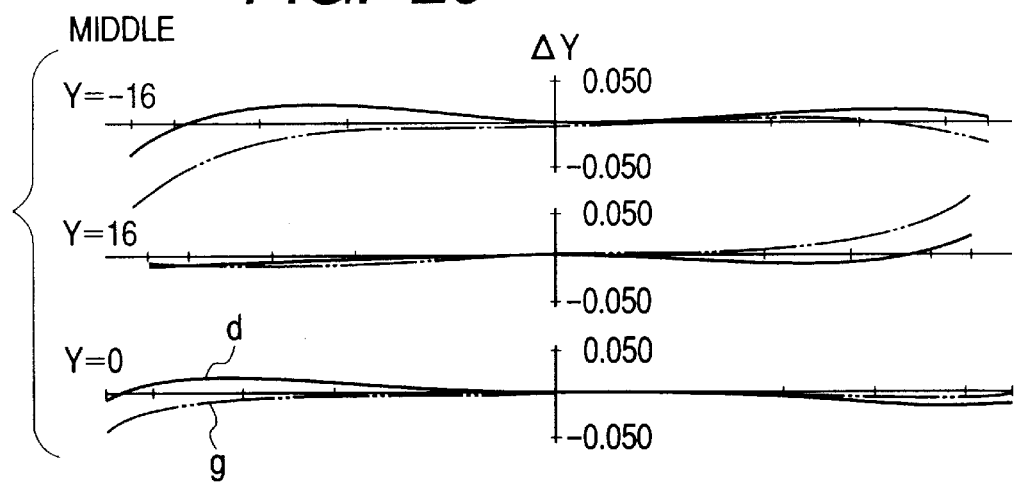
FIG. 20 is a view showing aberration at the middle with correction for an image blur corresponding to a 0.3 degree field angle according to the numerical third embodiment of the present invention.
Figure 21:
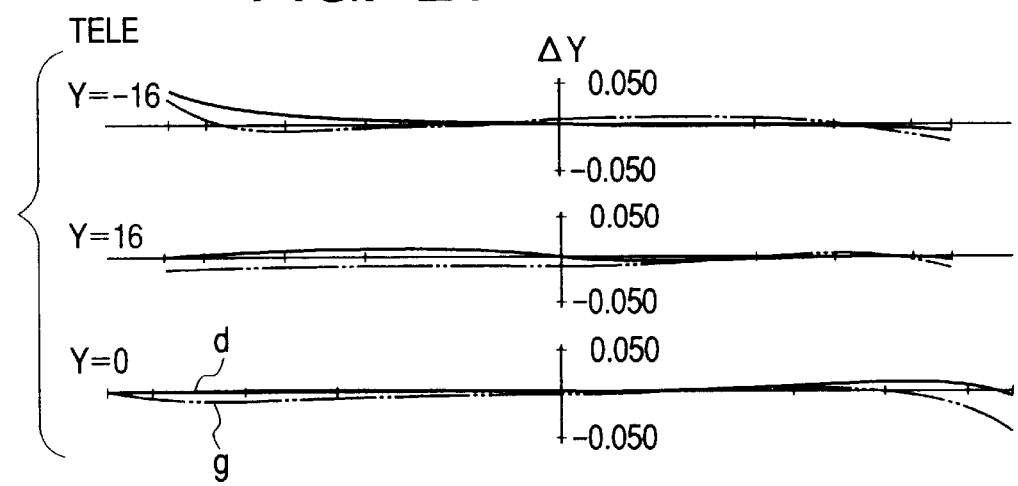
FIG. 21 is a view showing aberration at the telephoto end with correction for an image blur corresponding to a 0.3 degree field angle according to the numerical third embodiment of the present invention.
Figure 22:
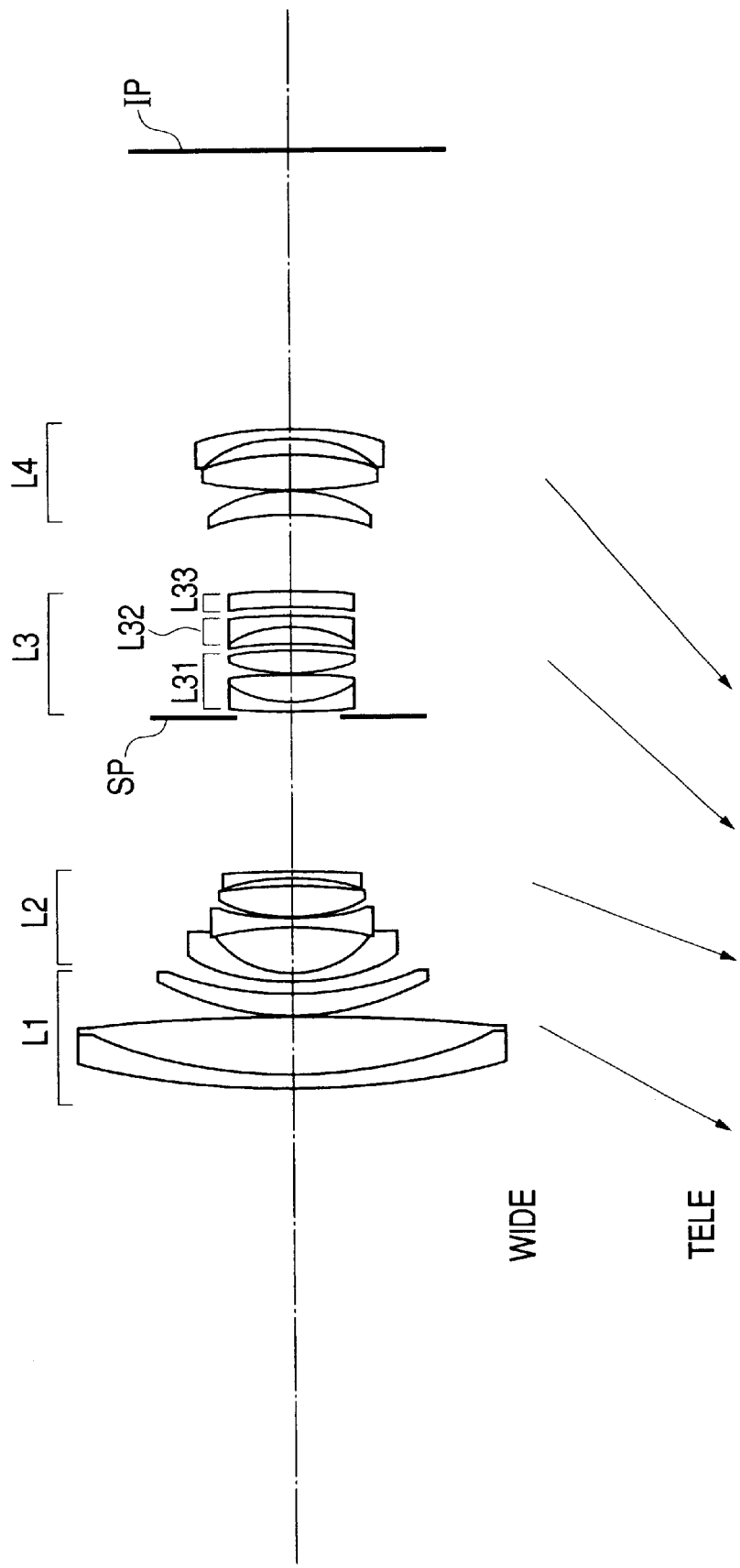
FIG. 22 is a sectional view showing a lens of a wide angle end according to a numerical fourth embodiment of the present invention.
Figure 23:
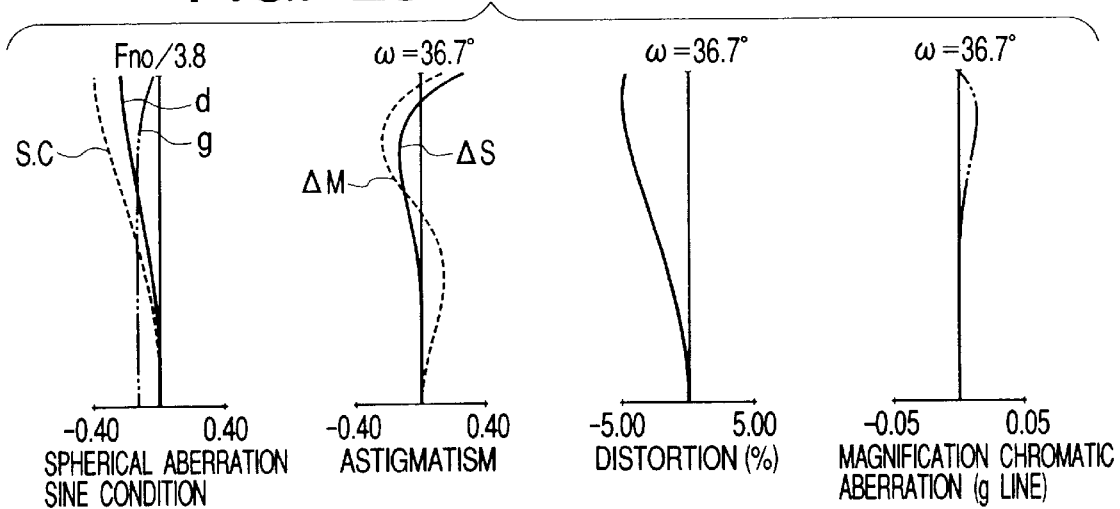
FIG. 23 is a view showing aberration at the wide angle end under a normal condition according to the numerical fourth embodiment of the present invention.
Figure 24:
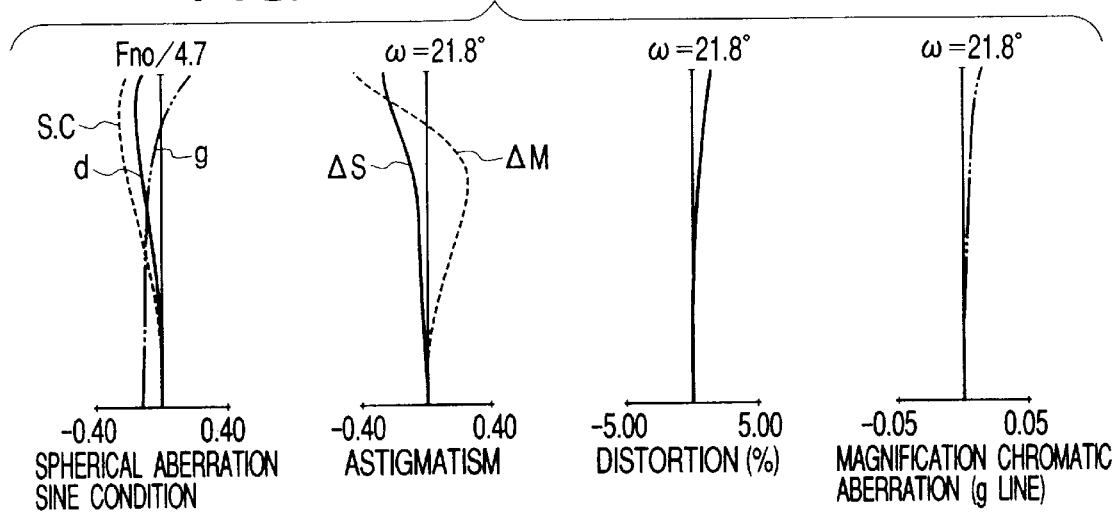
FIG. 24 is a view showing aberration at the middle under a normal condition according to the numerical fourth embodiment of the present invention.
Figure 25:
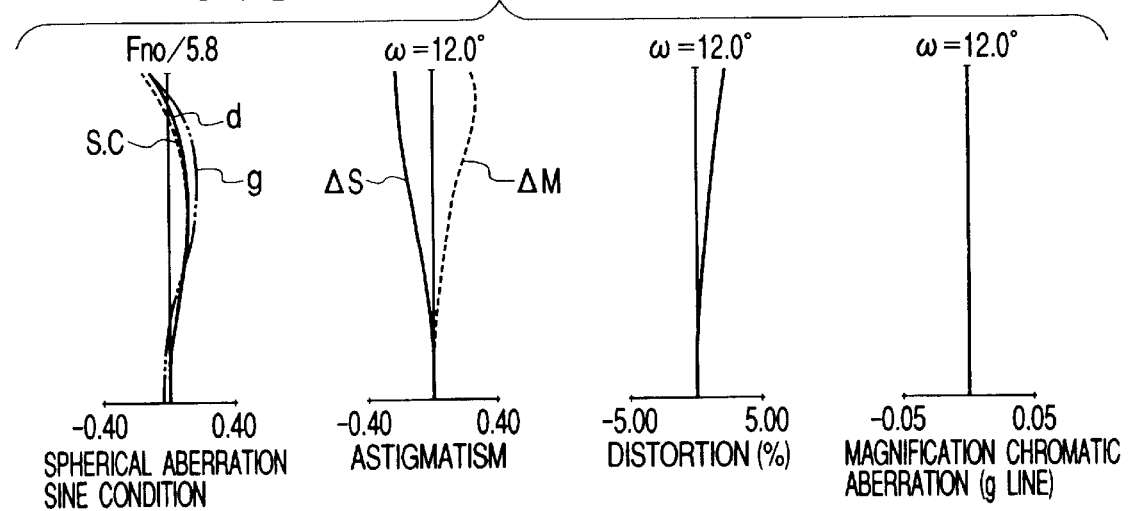
FIG. 25 is a view showing aberration at a telephoto end under a normal condition according to the numerical fourth embodiment of the present invention.
Figure 26:
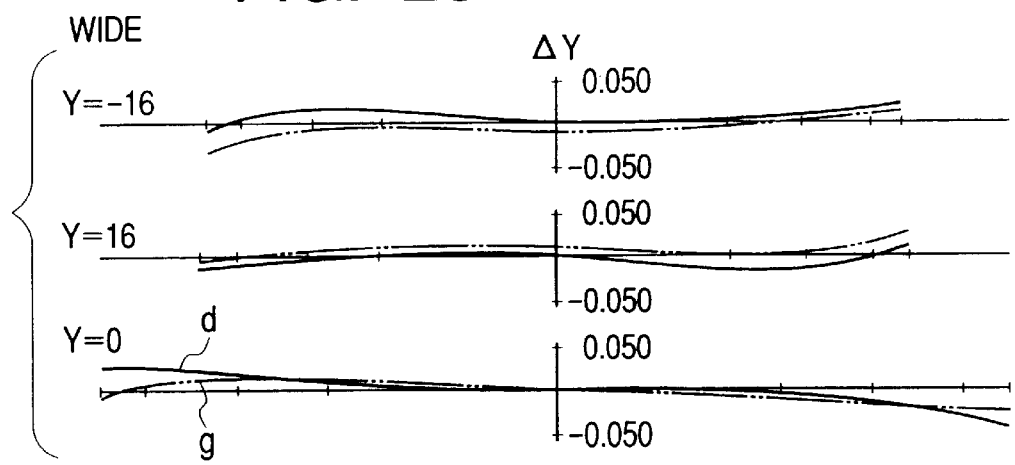
FIG. 26 is a view showing aberration at the wide angle end with correction for an image blur corresponding to a 0.3 degree field angle according to the numerical fourth embodiment of the present invention.
Figure 27:
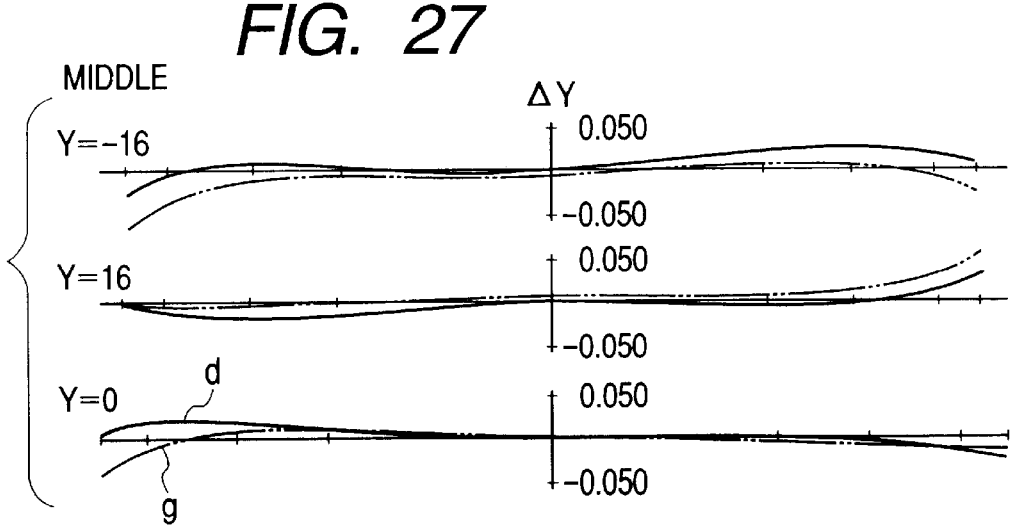
FIG. 27 is a view showing aberration at the middle with correction for an image blur corresponding to a 0.3 degree field angle according to the numerical fourth embodiment of the present invention.
Figure 28:
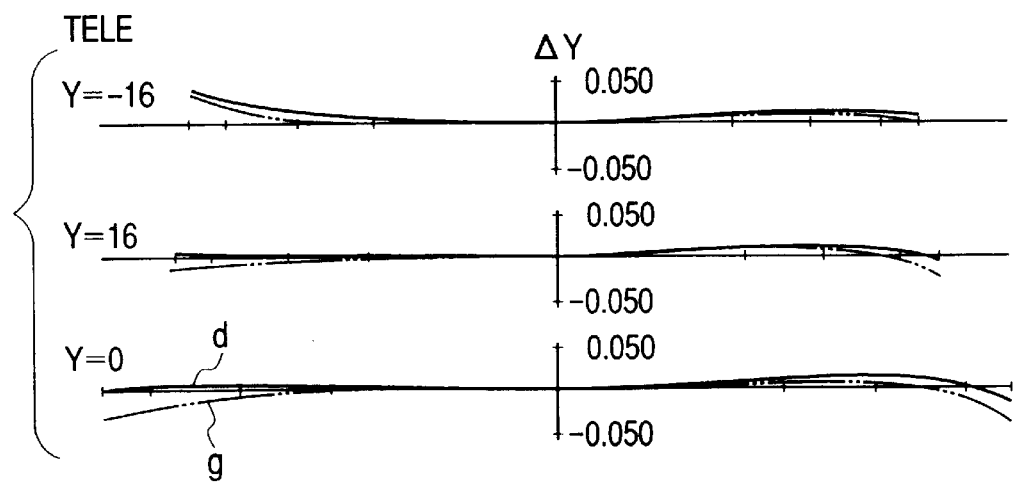
FIG. 28 is a view showing aberration at the telephoto end with correction for an image blur corresponding to a 0.3 degree field angle according to the numerical fourth embodiment of the present invention.
Figure 29:
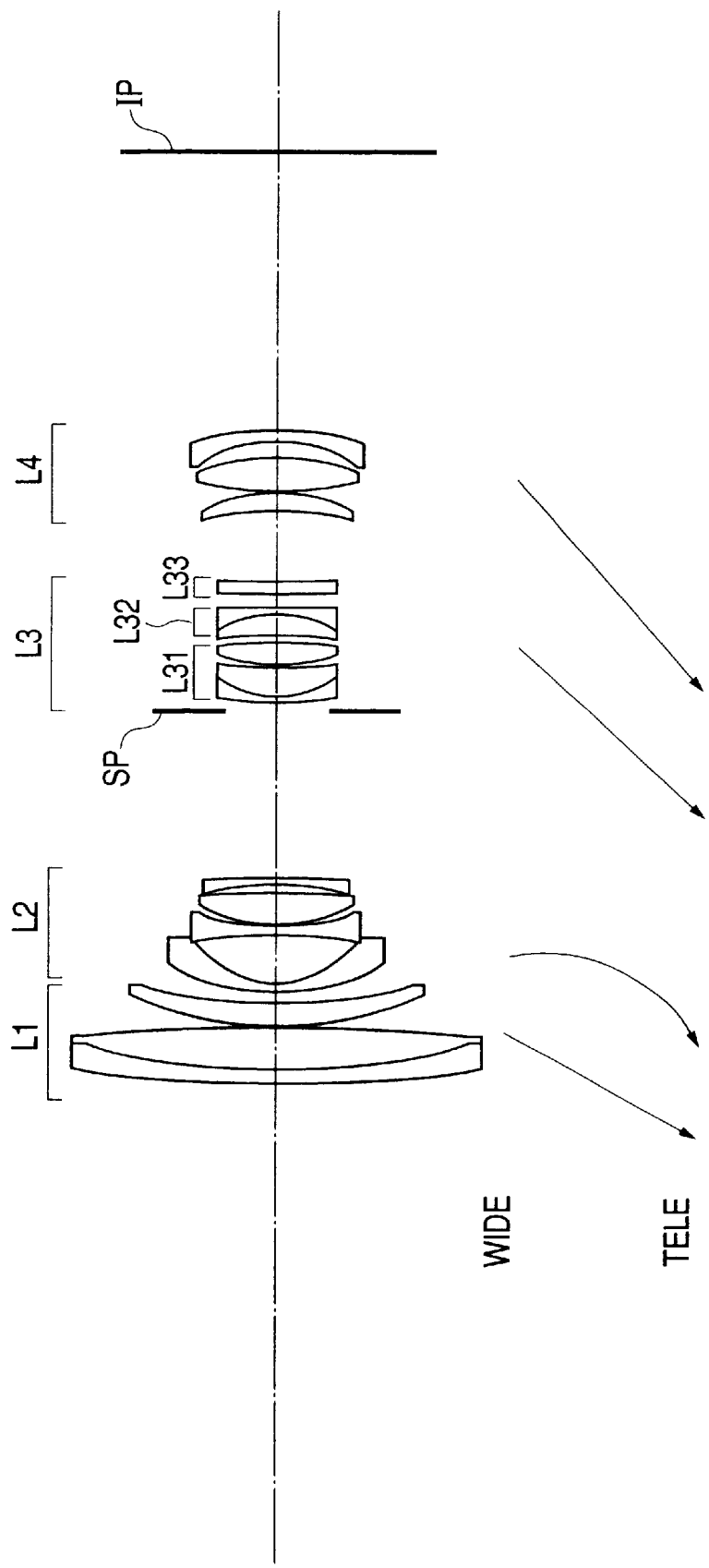
FIG. 29 is a sectional view showing a lens of a wide angle end according to a numerical fifth embodiment of the present invention.
Figure 30:
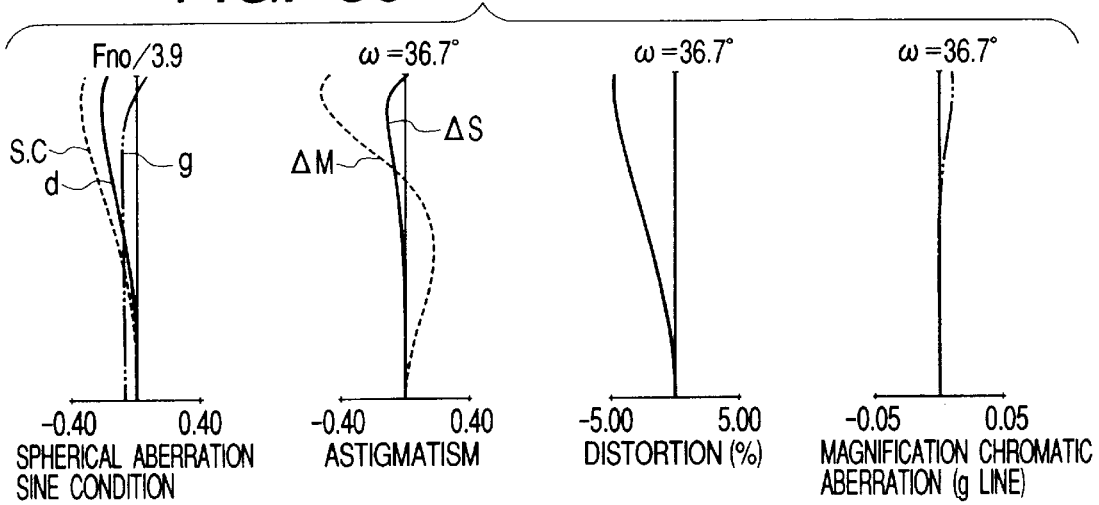
FIG. 30 is a view showing aberration at the wide angle end under a normal condition according to the numerical fifth embodiment of the present invention.
Figure 31:
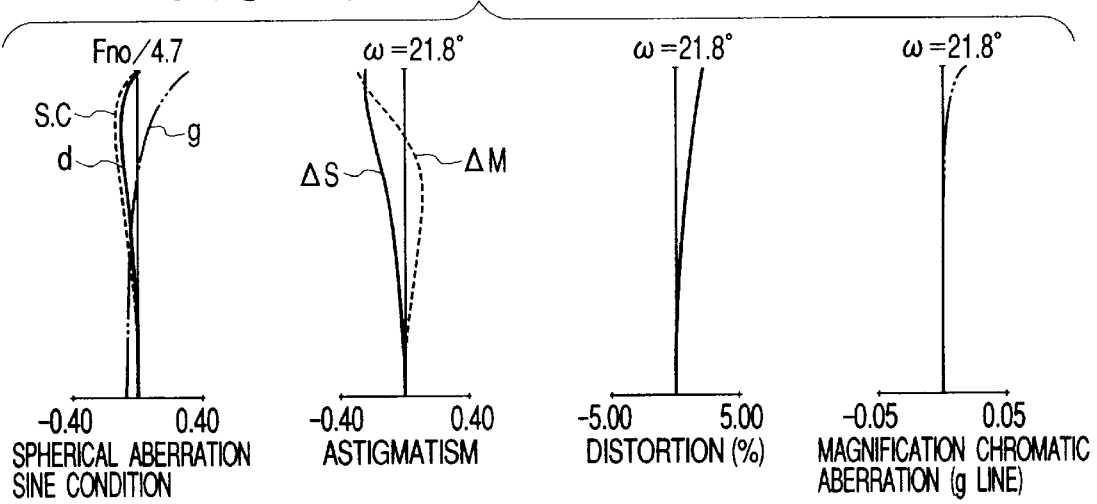
FIG. 31 is a view showing aberration at a middle under a normal condition according to the numerical fifth embodiment of the present invention.
Figure 32:
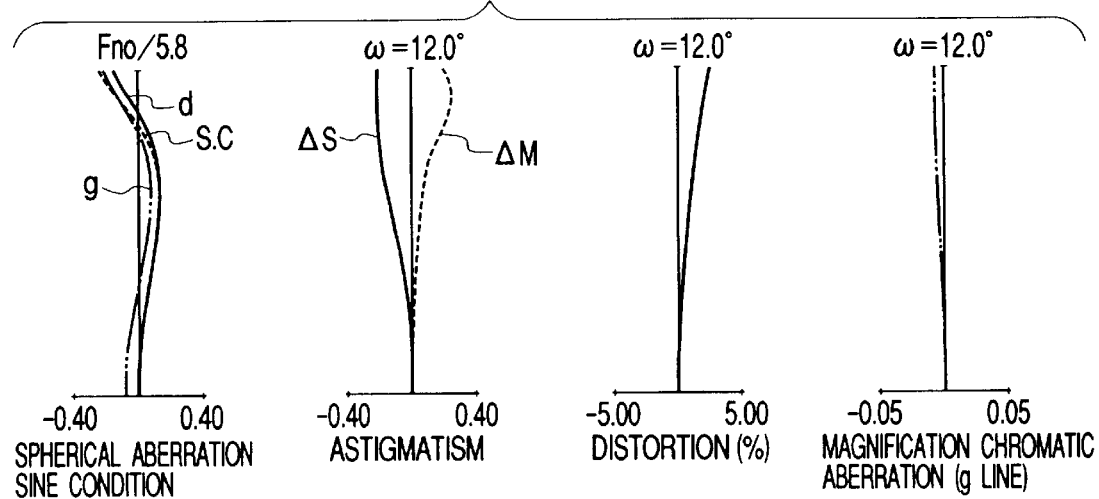
FIG. 32 is a view showing aberration at a telephoto end under a normal condition according to the numerical fifth embodiment of the present invention.
Figure 33:
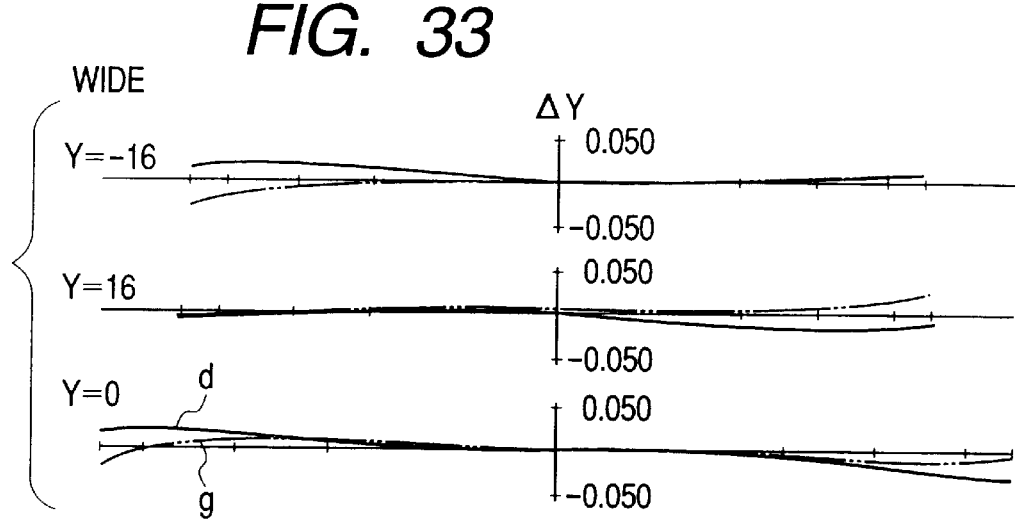
FIG. 33 is a view showing aberration at the wide angle end with correction for an image blur corresponding to a 0.3 degree field angle according to the numerical fifth embodiment of the present invention.
Figure 34:
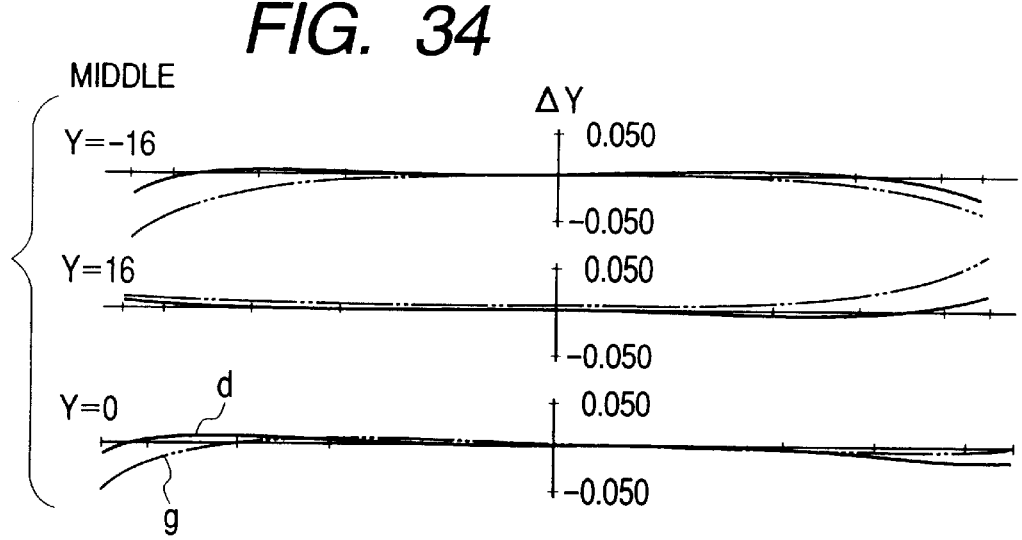
FIG. 34 is a view showing aberration at the middle with correction for an image blur corresponding to a 0.3 degree field angle according to the numerical fifth embodiment of the present invention.
Figure 35:
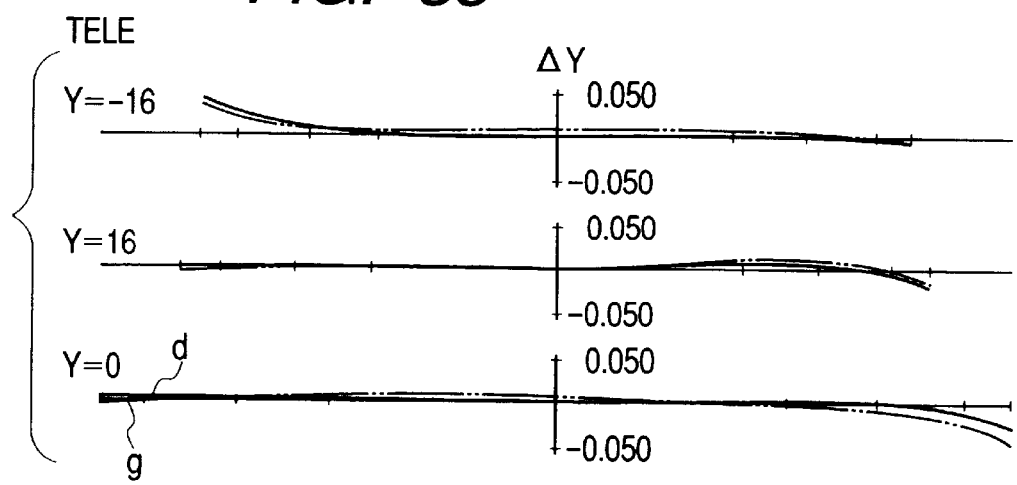
FIG. 35 is a view showing aberration at the telephoto end with correction for an image blur corresponding to a 0.3 degree field angle according to the numerical fifth embodiment of the present invention.

FIGS. 1, 8, 15, 22 and 29 are sectional views respectively showing lenses at wide angle ends according to numerical first to fifth embodiments of the present invention. FIGS. 2 to 4 are views respectively showing aberration at the wide angle end, a middle, and a telephoto end under a normal condition according to the numerical first embodiment of the present invention. FIGS. 5 to 7 are views respectively showing aberration at the wide angle end, the middle, and the telephoto end in a fluctuation compensation state (correction for image blur corresponding to a 0.3 degree field angle) according to the numerical first embodiment of the present invention. FIGS. 9 to 11 are views respectively showing aberration at the wide angle end, the middle, and the telephoto end according to the numerical second embodiment of the present invention. FIGS. 12 to 14 are views respectively showing aberration at the wide angle end, the middle, and the telephoto end in a fluctuation compensation state (correction for image blur corresponding to a 0.3 degree field angle) according to the numerical second embodiment of the present invention. FIGS. 16 to 18 are views respectively showing aberration at the wide angle end, the middle, and the telephoto end under a normal condition according to the numerical third embodiment of the present invention. FIGS. 19 to 21 are views showing aberration at the wide angle end, the middle, and the telephoto end in a fluctuation compensation state (correction for image blur corresponding to a 0.3 degree field angle) according to the numerical third embodiment of the present invention. FIGS. 23 to 25 are views respectively showing aberration at the wide angle end, the middle and the telephoto end under a normal condition according to the numerical fourth embodiment of the present invention. FIGS. 26 to 28 are views respectively showing aberration at the wide angle end, the middle, and the telephoto end in a fluctuation compensation state (correction for image blur corresponding to a 0.3 degree field angle) according to the numerical fourth embodiment of the present invention. FIGS. 30 to 32 are views respectively showing aberration at the wide angle end, the middle, and the telephoto end under a normal condition according to the numerical fifth embodiment of the present invention. FIGS. 33 to 35 are views respectively showing aberration at the wide angle end, the middle, and the telephoto end in a fluctuation compensation state (correction for image blur corresponding to a 0.3 degree field angle) according to the numerical fifth embodiment of the present invention.

In the drawings, L1, L2, L3, and L4 respectively designate a first lens group with a positive refractive power, a second lens group with a negative refractive power, a third lens group with a positive refractive power, and a fourth lens group with a positive refractive power. Each arrow in the drawings shows a direction in which a respective lens group is moved when the magnification is changed from the wide angle side to the telephoto side. SP designates a diaphragm (stop) which is provided between the second and third lens groups. IP designates an image plane.

Figure 1:
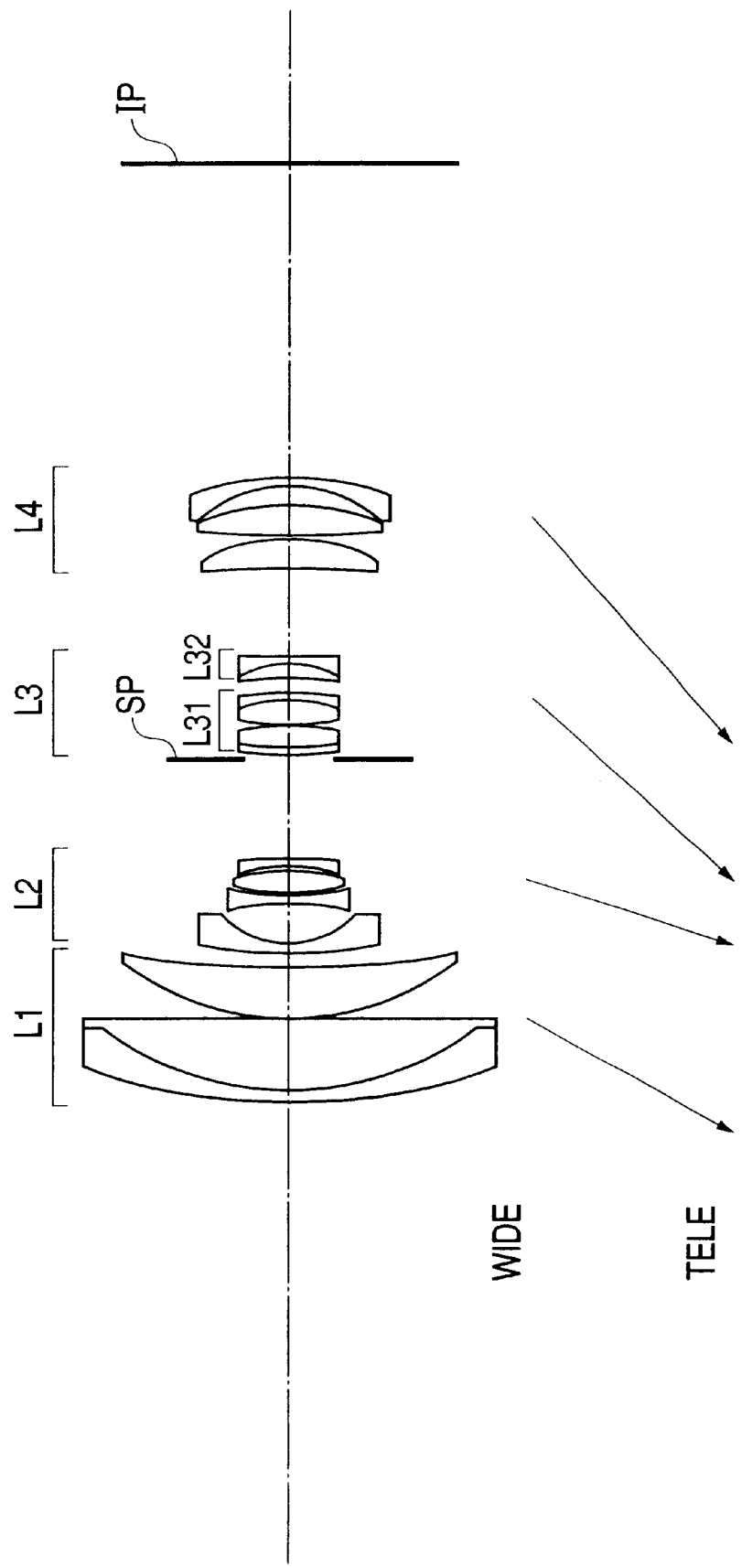
FIG. 1 is a sectional view showing a lens of a wide angle end according to a numerical first embodiment of the present invention.
Figure 8:
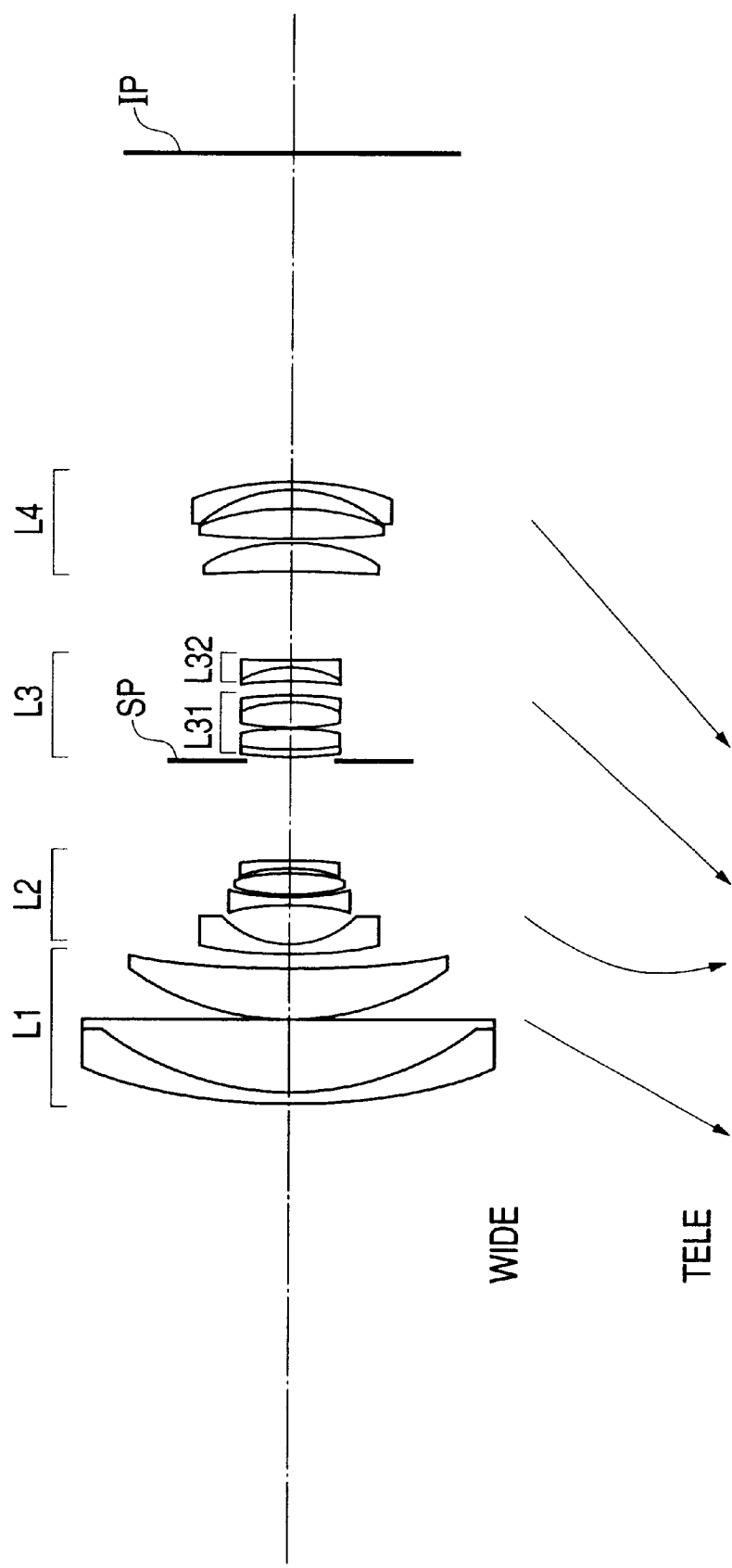
FIG. 8 is a sectional view showing a lens of a wide angle end according to a numerical second embodiment of the present invention.
Figure 15:
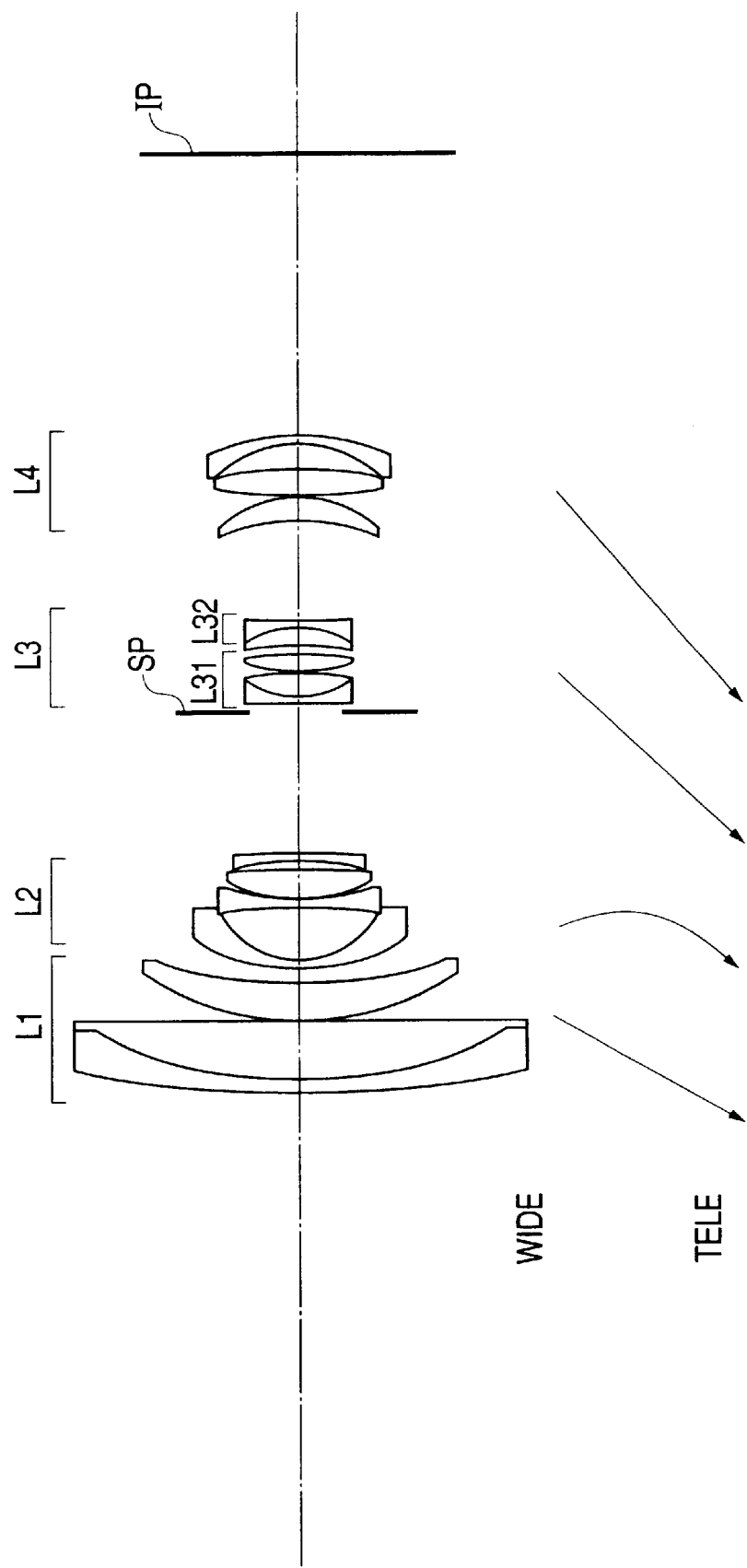
FIG. 15 is a sectional view showing a lens of a wide angle end according to a numerical third embodiment of the present invention.

In each of FIGS. 1, 8, and 15, the third lens group includes a positive refractive power, third-first lens group L31, and a fluctuation-preventive, third second lens group L32 with a negative refractive power. In each of FIGS. 22 and 29, the third lens group includes a third-first lens group L31 with a positive refractive power, a fluctuation-preventive third-second lens group L32 with a negative refractive power, and a third-third lens group L33 with a negative refractive power.

Each of the zoom lenses according to the numerical embodiments of the present invention includes the first lens group with positive refractive power, the second lens group with the negative refractive power, the third lens group with the positive refractive power, and the fourth lens group with the positive refractive power arranged in this order from the object side, in which at least the first, third and fourth lens groups are moved along the optical axis to vary spatial distances therebetween for a magnification change, while the third-second lens group L32 with the negative refractive power in the third lens group is moved perpendicular to the optical axis to change the imaging position.

In the magnification change, the spatial distance between the first lens group and the second lens group is varied so that the second lens group mainly performs the magnification changing operation, and the third lens group is moved to mainly perform the correcting operation for the image plane varied in association with the magnification change, and concurrently the spatial distance between the third lens group and the fourth lens group is varied to correct a variation in decentered aberration in association with the magnification change. In this case, the second lens group may be fixed with respect to the optical axis to simplify the mechanism. By disposing the third-second lens group with the negative refractive power within the third lens group with the positive refractive power, the negative refractive function of the third second lens group cancels the various aberrations caused by a lens group having the positive refractive function, which is located as a lens system, other than the third-second lens group, within the third lens group. This also serves to provide a larger displacement of the image position with a smaller amount of movement.

In this case, the third lens group includes, from the object side, the third-first lens group L31 with the positive refractive power, and the third-second lens group with the negative refractive power, or the third-first lens group L31 with the positive refractive power, the third-second lens group with the negative refractive power, and the third-third lens group with the negative refractive power, and the third-second lens group is moved perpendicular to the optical axis to displace or vary the imaging position. With this arrangement, the converging effect of the third-first lens group renders a lens system of the third-second lens group small in size and allows a moving mechanism for the third-second lens group to be simplified.

Although a zoom lens aimed at the present invention can be realized by satisfying the above-noted conditions, it is preferable to satisfy at least one of the following conditions in order that the zoom lens exhibits excellent optical performance and the entire optical system is made smaller.

(A) If focal lengths of the entire system at the wide angle end and the telephoto end are respectively represented by Fw and Ft, a focal length of the third lens group is repre-sented by F3, and a focal length of the third-second lens group is represented by F32, and if $$Fm = \sqrt{Fw \cdot Ft},$$

then the following conditions are satisfied:

$$0.35 < F3/Fm < 1 \tag{1}$$

$$-0.9 < F3/F32 < -0.18 \tag{2}$$

In a case where the refractive power of the third lens group is weakened beyond the upper limit of the formula (1), the amount of the movement of the lens group for securing a certain focal length and magnification changing ratio becomes large, and thus, the entire length of the lens system becomes disadvantageously large.

On the other hand, if the lower limit is exceeded, the refractive power of the third lens group becomes excessively strong to generate the strong negative spherical aberration, making it difficult to appropriately correct the aberration over the entire range of the magnification by other lens groups.

The formula (2) relates to the refractive power of the third-second lens group performing the operation of displacing the imaging position within the third lens group, and should be satisfied in order to maintain high quality image while suppressing the movement of the third-second lens group.

In a case where the negative refractive power of the third-second lens group is weakened beyond the upper limit of the formula (2), the amount of the movement of the third-second lens group required for performing a certain image position displacement operation is large, and further the lens diameter of the third-second lens group is increased in order to obtain certain peripheral optical intensity. Thus, it is not preferable.

On the other hand, in a case where the lower limit is exceeded, the negative refractive power of the third-second lens group is large, and then the lens system, other than the third-second lens group, within the third lens group must have a larger positive refractive power, and therefore high-ordered spherical aberration or coma aberration is largely generated, making it difficult to correct the aberration when the image position is displaced.

In addition, it is more preferable to modify the conditions (1) and (2) as follows:

$$0.4 < F3/Fm < 0.8 \tag{1a}$$

$$-0.8 < F3/F32 < -0.2 \tag{2a}$$

(B) If a radius of curvature of a lens plane located the closest to the image plane side within the third-first lens group is represented by Ra, and a radius of curvature of a lens plane located the closest to the object side within the third-second lens group is represented by Rb, then the following condition is satisfied:

$$-0.2 < (Ra+Rb)/(Ra-Rb) < 0.7 \tag{3}$$

The formula (3) should be satisfied in order that the lens surface configurations are appropriately arranged within the third lens group for the purpose of obtaining a high quality image. Outside the numerical range defined by the formula (3), an appropriate canceling relationship is not established in spherical aberration and coma aberration by mutual lens surfaces when the image position is changed and not changed, and therefore is not preferable.

In addition, it is more preferable to modify the formula (3) as follows:

$$-0.15 < (Ra+Rb)/(Ra-Rb) < 0.6 \quad (3a)$$

(C) If a focal length of an i-th lens group of the above-noted lens group is represented by Fi,
then the following conditions are satisfied:

$$0.7 < F1/Fm < 2.8 \quad (4)$$

$$0.15 < |F2/Fm| < 0.7 \quad (5)$$

$$0.5 < F4/Fm < 2.0 \quad (6)$$

The formulae (4) to (6) are for the purpose of mainly realizing a compact optical system with high image quality.

If the lens system is outside the upper limit of the formula (4), the refractive power of the first lens group becomes excessively weak so that the lens diameter and the lens entire length become large, which is not preferable.

On the other hand, if the lens system is outside the lower limit, the refractive power of the first lens group becomes excessively strong, so that high-ordered spherical aberration is largely generated, making it difficult to correct the aberration.

If the lens system is outside the upper limit of the formula (5), the refractive power of the second lens group is weakened, so that the amount of the movement of each lens group is large in order to obtain certain magnification changing ratio, and consequently it is difficult to make the lens system compact in size.

Of the lens system is outside the lower limit, the negative refractive power function becomes large, so that the Petzval sum becomes a large negative value, and thus the image surface curvature is large, which is not preferable.

If the lens system is outside the upper limit of the formula (6), the refractive power of the fourth lens group, becomes too weak, so that the back focus is long, and thus the entire length of the lens is large, which is not preferable.

On the other hand, if the lens system is outside the lower limit, the back focus of the entire lens system becomes too short, so that in a case where the lens system is, for instance, applied to a single reflex lens, the interference with a quick return mirror occurs. Further, decentered, high-ordered aberration such as image plane curvature, is largely generated.

In addition, it is more preferable to modify the conditions (4), (5) and (6) as follows:

$$0.9 < F1/Fm < 2.3 \quad (4a)$$

$$0.18 < |F2/Fm| < 0.6 \quad (5a)$$

$$0.6 < F4/Fm < 1.8 \quad (6a)$$

(D) The third-second lens group is preferably constituted by one positive lens and one negative lens. This is effective in suppressing aberration variation when the lens is moved to displace the image position.

(E) It is preferable that the focusing is carried out by moving the first lens group or the second lens group toward the object side. In particular, the system in which the second lens group is moved is preferable because the lens diameter of the first lens group is not increased. Both of the first and second lens groups may be moved to the object side to carry out the focusing.

(F) The first lens group is preferably constituted, from the object side, by a negative lens having a concave surface on the image plane side, which lens surface is stronger in refractive power than the that on the object side (hereafter, simply referred to as "the lens surface is stronger on the image plane side", when applicable), a positive lens, and a positive lens having a convex surface on the object side, which lens surface is stronger in refractive power than that on the image plane side (hereafter, simply referred to as "the lens surface is stronger on the object side", when applicable).

(G) The second lens group is preferably constituted, from the object side, by a negative lens having a concave surface which lens surface is stronger on the image plane side, a negative lens having concave surfaces on both sides, a positive lens having a convex surface which lens surface is stronger on the object side, and a negative lens having a concave surface which lens surface is stronger on the object side. Further, the negative lens located closest to the image plane side is preferably constructed as a composite lens of a negative lens and a positive lens to realize the higher image quality.

(H) The third-first lens group is preferably constituted, from the object side, by a composite lens in which a meniscus-like, negative lens having a concave surface stronger on the image plane side is adhered to a positive lens to constitute a lens group as being entirely positive, and a positive single lens or a composite lens in which a positive lens is adhered to a negative lens to constitute a lens group as being entirely positive.

(I) The third-second lens group is preferably constituted by a composite lens group in which a positive lens having a convex surface oriented to the image-plane side is adhered to a negative lens having a concave surface, which lens surface is stronger on the object side to constitute a lens group as being entirely negative.

(J) It is preferable to dispose, on the image plane side of the third-second lens group, a third-third lens group having a negative or positive refractive power, which is stationary during fluctuation prevention. With this arrangement, a further aberration correcting effect can be expected.

(K) The fourth lens group is preferably constituted, from the object side, by a positive lens having a convex surface stronger on the image plane side, a positive lens having convex surfaces on both sides, and a meniscus-like negative lens having a concave surface stronger on the object side.

(L) In order to improve the optical performance, a non-spherical surface, a grading optical element, and/or a gradient index optical element are preferably introduced into the lens system.

Next, specific numerical embodiments will be described.

In the numerical embodiments, Ri and Di respectively represent the thickness and the spatial distance of an i-th lens counted from the object side, and Ni and vi respectively represent the refractive power and the abbe number of the material of the i-th lens counted from the object side.

Non-spherical surface constants K, A, B, C, and D are defined by the following condition:

$$X = \frac{H^2/R}{1 + \sqrt{1-(1+K)(H/R)^2}} + A \cdot H^2 + B \cdot H^4 + C \cdot H^6 + D \cdot H^8 + E \cdot H^{10}$$

where X denotes the amount of displacement in a direction from an optical axis to a lens apex, H denotes the distance from an optical axis, and R denotes the radius of curvature. Further, "e-X" means "$\times 10^{-x}$".

Relationships of numerical values of the numerical embodiments to aforementioned formulae are shown in Table 1.

Numerical Value Embodiment 1 f = 29.00~101.37  Fno = 4.54~5.75  2ω = 73.5°~24.1°

| | | | |
|---|---|---|---|
| R1 = 86.687 | D1 = 1.50 | N1 = 1.846660 | ν1 = 23.9 |
| R2 = 42.162 | D2 = 8.70 | N2 = 1.603112 | ν2 = 60.6 |
| R3 = 467.815 | D3 = 0.15 | | |
| R4 = 36.727 | D4 = 6.40 | N3 = 1.733997 | ν3 = 51.5 |
| R5 = 125.386 | D5 = variable | | |
| R6 = 64.747 | D6 = 1.20 | N4 = 1.834807 | ν4 = 42.7 |
| R7 = 11.848 | D7 = 5.34 | | |
| R8 = −38.336 | D8 = 1.00 | N5 = 1.804000 | ν5 = 46.6 |
| R9 = 29.098 | D9 = 0.20 | | |
| R10 = 21.706 | D10 = 3.10 | N6 = 1.846660 | ν6 = 23.9 |
| R11 = −41.601 | D11 = 0.60 | | |
| R12 = −22.294 | D12 = 1.00 | N7 = 1.804000 | ν7 = 46.6 |
| R13 = −120.841 | D13 = variable | | |
| R14 = stop | D14 = 0.15 | | |
| R15 = 37.070 | D15 = 0.90 | N8 = 1.805181 | ν8 = 25.4 |
| R16 = 24.498 | D16 = 3.00 | N9 = 1.639300 | ν9 = 44.9 |
| R17 = −39.035 | D17 = 0.20 | | |
| R18 = 40.272 | D18 = 3.30 | N10 = 1.570989 | ν10 = 50.8 |
| R19 = −15.064 | D19 = 0.90 | N11 = 1.846660 | ν11 = 23.9 |
| R20 = −36.396 | D20 = 1.73 | | |
| R21 = −40.584 | D21 = 0.90 | N12 = 1.846660 | ν12 = 23.9 |
| R22 = −13.785 | D22 = 0.90 | N13 = 1.749497 | ν13 = 35.3 |
| R23 = 83.142 | D23 = variable | | |
| R24 = −132.327 | D24 = 3.80 | N14 = 1.487490 | ν14 = 70.2 |
| R25 = −22.027 | D25 = 0.20 | | |
| R26 = 110.113 | D26 = 4.00 | N15 = 1.487490 | ν15 = 70.2 |
| R27 = −41.738 | D27 = 2.38 | | |
| R28 = −19.597 | D28 = 1.40 | N16 = 1.846660 | ν16 = 23.9 |
| R29 = −33.679 | | | |

| | focal distance | | |
|---|---|---|---|
| variable range | 29.00 | 54.74 | 101.37 |
| D5 | 1.89 | 10.94 | 22.39 |
| D13 | 12.99 | 6.28 | 1.45 |
| D23 | 11.52 | 8.24 | 7.12 |

Numerical Value Embodiment 2 f = 29.00~101.30  Fno = 4.39~5.75  2ω = 73.5°~24.1°

| | | | |
|---|---|---|---|
| R1 = 83.702 | D1 = 1.50 | N1 = 1.846660 | ν1 = 23.9 |
| R2 = 41.079 | D2 = 8.40 | N2 = 1.603112 | ν2 = 60.6 |
| R3 = 359.634 | D3 = 0.15 | | |
| R4 = 38.654 | D4 = 6.40 | N3 = 1.719995 | ν3 = 50.2 |
| R5 = 150.065 | D5 = variable | | |
| R6 = 64.696 | D6 = 1.20 | N4 = 1.834807 | ν4 = 42.7 |
| R7 = 12.027 | D7 = 5.00 | | |
| R8 = −37.123 | D8 = 1.00 | N5 = 1.804000 | ν5 = 46.6 |
| R9 = 28.835 | D9 = 0.20 | | |
| R10 = 21.702 | D10 = 3.10 | N6 = 1.846660 | ν6 = 23.9 |
| R11 = −39.022 | D11 = 0.60 | | |
| R12 = −22.580 | D12 = 1.00 | N7 = 1.804000 | ν7 = 46.6 |
| R13 = −120.841 | D13 = variable | | |
| R14 = stop | D14 = 0.15 | | |
| R15 = 37.553 | D15 = 0.90 | N8 = 1.805181 | ν8 = 25.4 |
| R16 = 25.970 | D16 = 3.00 | N9 = 1.639300 | ν9 = 44.9 |
| R17 = −45.144 | D17 = 0.20 | | |
| R18 = 41.663 | D18 = 3.30 | N10 = 1.570989 | ν10 = 50.8 |
| R19 = −14.860 | D19 = 0.90 | N11 = 1.846660 | ν11 = 23.9 |
| R20 = −38.349 | D20 = 1.50 | | |
| R21 = −42.901 | D21 = 2.20 | N12 = 1.846660 | ν12 = 23.9 |
| R22 = −13.652 | D22 = 0.90 | N13 = 1.749497 | ν13 = 35.3 |
| R23 = 91.409 | D23 = variable | | |
| R24 = −133.590 | D24 = 3.80 | N14 = 1.487490 | ν14 = 70.2 |
| R25 = −21.523 | D25 = 0.20 | | |
| R26 = 107.117 | D26 = 3.80 | N15 = 1.487490 | ν15 = 70.2 |
| R27 = −42.147 | D27 = 2.60 | | |
| R28 = −19.781 | D28 = 1.40 | N16 = 1.846660 | ν16 = 23.9 |
| R29 = −33.679 | | | |

| | focal distance | | |
|---|---|---|---|
| variable range | 29.00 | 55.00 | 101.30 |
| D5 | 2.00 | 10.87 | 22.39 |
| D13 | 13.51 | 6.31 | 1.45 |
| D23 | 11.52 | 8.30 | 7.12 |

Numerical Value Embodiment 3 f = 29.00~101.50  Fno = 4.10~5.75  2ω = 73.5°~24.1°

| | | | |
|---|---|---|---|
| R1 = 141.446 | D1 = 1.80 | N1 = 1.846660 | ν1 = 23.8 |
| R2 = 65.548 | D2 = 8.00 | N2 = 1.603112 | ν2 = 60.6 |
| R3 = −1920.275 | D3 = 0.15 | | |
| R4 = 41.278 | D4 = 5.00 | N3 = 1.733997 | ν3 = 51.5 |
| R5 = 69.266 | D5 = variable | | |
| R6 = 26.753 | D6 = 1.20 | N4 = 1.834807 | ν4 = 42.7 |
| R7 = 12.779 | D7 = 6.97 | | |
| R8 = −111.739 | D8 = 1.00 | N5 = 1.804000 | ν5 = 46.6 |
| R9 = 27.679 | D9 = 0.20 | | |
| R10 = 20.183 | D10 = 4.20 | N6 = 1.846660 | ν6 = 23.8 |
| R11 = −229.709 | D11 = 1.20 | | |
| R12 = −34.939 | D12 = 1.00 | N7 = 1.804000 | ν7 = 46.6 |
| R13 = 343.160 | D13 = variable | | |
| R14 = stop | D14 = 1.00 | | |
| R15 = 382.311 | D15 = 0.90 | N8 = 1.805181 | ν8 = 25.4 |
| R16 = 13.917 | D16 = 3.20 | N9 = 1.639300 | ν9 = 44.9 |
| R17 = −70.454 | D17 = 0.20 | | |
| R18 = 26.018 | D18 = 2.50 | N10 = 1.720000 | ν10 = 43.7 |
| R19 = −51.100 | D19 = 1.50 | | |
| R20 = −45.633 | D20 = 2.40 | N11 = 1.846660 | ν11 = 23.8 |
| R21 = −15.099 | D21 = 0.90 | N12 = 1.749497 | ν12 = 35.3 |
| R22 = 225.399 | D22 = variable | | |
| R23 = −25.512 | D23 = 3.00 | N13 = 1.487490 | ν13 = 70.2 |
| R24 = −17.904 | D24 = 0.20 | | |
| R25 = 65.171 | D25 = 4.00 | N14 = 1.487490 | ν14 = 70.2 |
| R26 = −43.800 | D26 = 3.14 | | |
| R27 = −18.241 | D27 = 1.40 | N15 = 1.846660 | ν15 = 23.8 |
| R28 = −31.177 | | | |

| | focal distance | | |
|---|---|---|---|
| variable range | 29.00 | 54.00 | 101.50 |
| D5 | 1.80 | 15.36 | 29.97 |
| D13 | 20.13 | 8.98 | 1.29 |
| D22 | 14.01 | 10.76 | 9.85 |

Numerical Value Embodiment 4 f = 29.01~101.35  Fno = 3.77~5.80  2ω = 73.4°~24.1°

| | | | |
|---|---|---|---|
| R1 = 126.261 | D1 = 1.80 | N1 = 1.846660 | ν1 = 23.8 |
| R2 = 66.940 | D2 = 8.00 | N2 = 1.603112 | ν2 = 60.6 |
| R3 = −282.096 | D3 = 0.15 | | |
| R4 = 37.686 | D4 = 3.00 | N3 = 1.670000 | ν3 = 57.3 |
| R5 = 46.991 | D5 = variable | | |
| R6 = 33.243 | D6 = 1.20 | N4 = 1.873996 | ν4 = 35.3 |
| R7 = 14.216 | D7 = 6.40 | | |
| R8 = −47.453 | D8 = 1.00 | N5 = 1.743198 | ν5 = 49.3 |
| R9 = 42.606 | D9 = 0.20 | | |

-continued

Numerical Value Embodiment 4

| R10 = 25.841 | D10 = 4.20 | N6 = 1.846660 | ν6 = 23.8 |
| R11 = −62.181 | D11 = 1.02 | | |
| R12 = −28.083 | D12 = 1.00 | N7 = 1.804000 | ν7 = 46.6 |
| R13 = −274.061 | D13 = variable | | |
| R14 = stop | D14 = 1.00 | | |
| R15 = 89.494 | D15 = 0.90 | N8 = 1.784723 | ν8 = 25.7 |
| R16 = 14.136 | D16 = 4.00 | N9 = 1.670000 | ν9 = 57.3 |
| R17 = −236.326 | D17 = 0.20 | | |
| R18 = 24.385 | D18 = 3.30 | N10 = 1.647689 | ν10 = 33.8 |
| R19 = −46.622 | D19 = 1.00 | | |
| R20 = −47.442 | D20 = 2.40 | N11 = 1.846660 | ν11 = 23.8 |
| R21 = −16.552 | D21 = 0.90 | N12 = 1.739997 | ν12 = 31.7 |
| R22 = −615.178 | D22 = 1.80 | | |
| R23 = −58.954 | D23 = 1.80 | N13 = 1.740999 | ν13 = 52.6 |
| *R24 = −211.512 | D24 = variable | | |
| R25 = −30.176 | D25 = 3.00 | N14 = 1.548141 | ν14 = 45.8 |
| R26 = −20.181 | D26 = 0.20 | | |
| R27 = 62.613 | D27 = 5.00 | N15 = 1.510091 | ν15 = 63.6 |
| R28 = −33.511 | D28 = 2.07 | | |
| R29 = −20.285 | D29 = 1.40 | N16 = 1.846660 | ν16 = 23.8 |
| R30 = −49.470 | | | |

| | focal distance | | |
|---|---|---|---|
| variable range | 29.01 | 53.97 | 101.35 |
| D5 | 1.80 | 14.59 | 29.63 |
| D13 | 21.08 | 8.91 | 1.00 |
| D24 | 11.12 | 9.28 | 9.18 | aspherical coefficient 24 surfaces: k = −5.62727e+02
A = 0  B = 1.89300e−06  C = 3.98391e−08
D = −7.41272e−11  E = 0.00000e+00

Numerical Value Embodiment 5 f = 29.00~101.50  Fno = 3.86~5.75  2ω = 73.5°~24.1°

| R1 = 233.840 | D1 = 1.80 | N1 = 1.846660 | ν1 = 23.8 |
| R2 = 98.856 | D2 = 6.00 | N2 = 1.658296 | ν2 = 57.3 |
| R3 = −305.171 | D3 = 0.15 | | |
| R4 = 51.919 | D4 = 3.00 | N3 = 1.603112 | ν3 = 60.7 |
| R5 = 80.974 | D5 = variable | | |
| R6 = 33.135 | D6 = 1.20 | N4 = 1.850259 | ν4 = 32.3 |
| R7 = 14.698 | D7 = 6.73 | | |
| R8 = −66.153 | D8 = 1.00 | N5 = 1.712995 | ν5 = 53.9 |
| R9 = 34.324 | D9 = 0.20 | | |
| R10 = 24.112 | D10 = 4.20 | N6 = 1.846660 | ν6 = 23.8 |
| R11 = −131.824 | D11 = 1.35 | | |
| R12 = −32.019 | D12 = 1.00 | N7 = 1.743198 | ν7 = 49.3 |
| R13 = −263.558 | D13 = variable | | |
| R14 = stop | D14 = 1.00 | | |
| R15 = 47.410 | D15 = 0.90 | N8 = 1.800999 | ν8 = 35.0 |
| R16 = 12.758 | D16 = 4.30 | N9 = 1.677900 | ν9 = 55.3 |
| R17 = 114.951 | D17 = 0.20 | | |
| R18 = 26.510 | D18 = 3.00 | N10 = 1.677900 | ν10 = 55.3 |
| R19 = −125.081 | D19 = 1.30 | | |
| R20 = −47.415 | D20 = 3.00 | N11 = 1.846660 | ν11 = 23.8 |
| R21 = −18.117 | D21 = 0.90 | N12 = 1.717362 | ν12 = 29.5 |
| R22 = −311.396 | D22 = 1.80 | | |
| R23 = 195.852 | D23 = 1.80 | N13 = 1.670000 | ν13 = 57.3 |
| *R24 = 7619.687 | D24 = variable | | |
| R25 = −30.835 | D25 = 2.50 | N14 = 1.568728 | ν14 = 63.2 |
| R26 = −21.996 | D26 = 0.20 | | |
| R27 = 72.912 | D27 = 4.80 | N15 = 1.518206 | ν15 = 65.0 |
| R28 = −28.835 | D28 = 2.18 | | |
| R29 = −18.744 | D29 = 1.40 | N16 = 1.850259 | ν16 = 32.3 |
| R30 = −51.138 | | | |

-continued

Numerical Value Embodiment 5

| | focal distance | | |
|---|---|---|---|
| variable range | 29.00 | 54.00 | 101.50 |
| D5 | 1.80 | 17.95 | 36.60 |
| D13 | 23.15 | 10.02 | 1.35 |
| D24 | 10.14 | 8.31 | 8.09 | aspherical coefficient 24 surfaces: k = 1.81112e+04
A = 0  B = 1.77443e−06  C = −2.39986e−08
D = −5.47733e−11  E = 0.00000e+00

TABLE 1

| Condition expression | Numerical Value Embodiment | | | | |
|---|---|---|---|---|---|
| | 1 | 2 | 3 | 4 | 5 |
| F3/Fm | 0.594 | 0.650 | 0.445 | 0.700 | 0.586 |
| F3/F32 | −0.739 | −0.736 | −0.372 | −0.380 | −0.258 |
| (Ra + Rb)/(Ra − Rb) | −0.054 | −0.056 | 0.057 | −0.009 | 0.450 |
| F1/Fm | 1.087 | 1.126 | 1.794 | 2.005 | 2.249 |
| |F2/Fm| | 0.226 | 0.234 | 0.342 | 0.370 | 0.413 |
| F4/Fm | 0.991 | 0.939 | 0.678 | 1.680 | 0.697 |

Next, an embodiment in which the zoom lens described above is applied to a photographing apparatus will be described with reference to FIG. 36.

Figure 36:
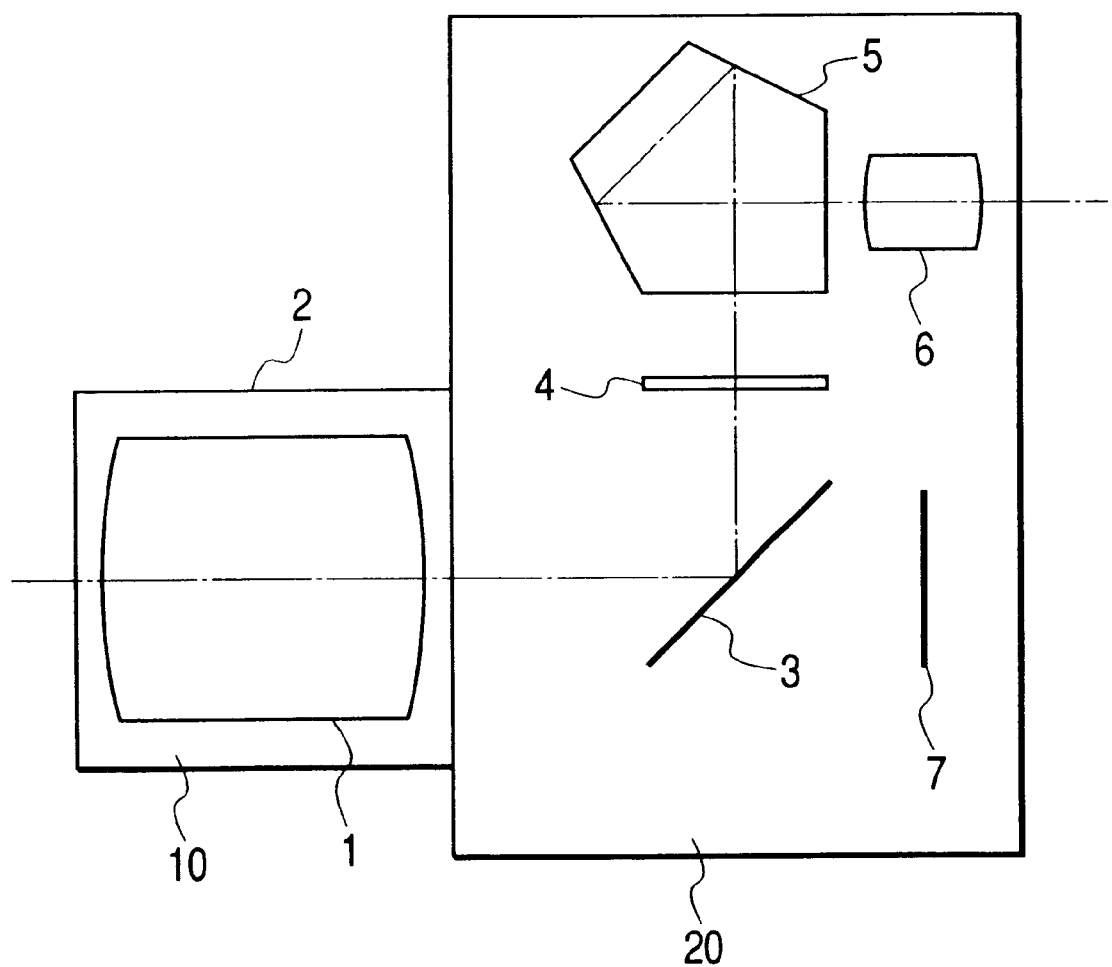
FIG. 36 is a schematic view showing major portions of a single reflex camera to which a zoom lens according to the present invention is applied.

FIG. 36 is a schematic diagram showing major portions of a single reflex camera. In FIG. 36, reference numeral 10 designates a photographing lens having the zoom lens 1 described above. The zoom lens 1 is held by a barrel 2, i.e. a holding member. Reference numeral 20 designates a camera main body which includes a quick return mirror 3 for reflecting rays of light from the photographing lens 10 upwardly, a focusing glass 4 disposed at a imaging forming position of the photographing lens 10, a pentadahaprism 5 for converting an inverted image formed on the focusing glass 4 into an erect image, and an eyepiece lens 6 or the like for observing the erect image. Reference numeral 7 designates a film plane. During photographing, the quick return mirror 3 is retracted from the optical path so that an image is formed on the film plane 7 by the photographing lens 10.

The zoom lens described above can be effectively applied to the photographing apparatus as described with reference to this embodiment.

According to the present invention, a relatively small and light-weight lens group forming a part of a zoom lens is moved in a direction perpendicular to an optical axis to correct image blur cause due to fluctuation (inclination) of a zoom lens. In this system, the lens arrangement for the zoom lens is optimized to realize the zoom lens which is compact in size, having a simple mechanism, having a small load when applied to driving means, and which can effectively correct a certain image blur with a small amount of displacement of the lens group.

What is claimed is:

1. A zoom lens comprising:
   a first lens unit with a positive refractive power;
   a second lens unit with a negative refractive power;
   a third lens unit with a positive refractive power; and
   a fourth lens unit with a positive refractive power, which are arranged in this order from an object side, wherein at least the first, third and fourth lens units are moved along an optical axis to vary spatial distances of the lens units to thereby change the magnification of the zoom lens, wherein the third lens unit includes a first lens subunit with a positive refractive power, and a second lens subunit with a negative refractive power, and an image is displaced by moving said second lens subunit in such a way as to have a component perpendicular to an optical axis of said zoom lens.

2. A zoom lens according to claim 1, wherein said first lens subunit with the positive refractive power and said second lens subunit with the negative refractive power are arranged in this order from the object side.

3. A zoom lens according to claim 1, which satisfy the following conditions:

$$0.35 < F3/Fm < 1$$

$$-0.9 < F3/F32 < -0.18$$

where focal lengths of the entire system at a wide angle end and a telephoto end are respectively represented by Fw and Ft, the focal length of the third lens unit is represented by F3, the focal length of the second lens subunit is represented by F32, and $Fm = (Fw \times Ft)^{1/2}$.

4. A zoom lens according to claim 1, wherein the second lens subunit is moved to have a perpendicular vector component with respect to the optical axis to thereby correct image blur caused due to fluctuation of the zoom lens.

5. A zoom lens according to claim 1, which satisfy the following condition:

$$-0.2 < (Ra+Rb)/(Ra-Rb) < 0.7$$

where the radius of curvature of a lens plane located closest to an image plane side within the first lens subunit is represented by Ra, and the radius of curvature of a lens plane located closest to the object side within the second lens subunit is represented by Rb.

6. A zoom lens according to claim 1, which satisfy the following conditions:

$$0.7 < F1/Fm < 2.8$$

$$0.15 < |F2/Fm| < 0.7$$

$$0.5 < F4/Fm < 2.0$$

where the focal length of an i-th lens unit of the lens units is represented by Fi.

7. A zoom lens according to claim 1, wherein the second lens subunit includes a single positive lens and a single negative lens.

8. A zoom lens according to claim 1, wherein the first lens subunit includes, from the object side, a positive refractive power, composite lens in which a meniscus-like, negative lens having a concave surface on an image plane side is adhered to a positive lens, and a positive single lens or a positive refractive power, composite lens in which a positive lens is adhered to a negative lens.

9. A zoom lens according to claim 1, wherein the second lens subunit includes a negative refractive power, composite lens in which a positive lens having a convex surface oriented to an image plane side is adhered to a negative lens having a concave surface oriented to the object side.

10. A zoom lens according to claim 1, wherein the third lens unit further includes a third lens subunit having a negative or positive refractive power on an image plane side of the second lens subunit.

11. A photographing apparatus comprising:

the zoom lens according to claim 1; and a casing holding the zoom lens.

12. A zoom lens according to claim 11, wherein said first lens subunit with the positive refractive power and said second lens subunit with the negative refractive power are arranged in this order from the object side.

13. A photographing apparatus according to claim 11, which satisfy the following conditions:

$$0.35 < F3/Fm < 1$$

$$-0.9 < F3/F32 < -0.18$$

where focal lengths of the entire system at a wide angle end and a telephoto end are respectively represented by Fw and Ft, the focal length of the third lens unit is represented by F3, the focal length of the second lens subunit is represented by F32, and $Fm = (Fw \times Ft)^{1/2}$.

14. A photographing apparatus according to claim 11, wherein the second lens subunit is moved to have a perpendicular vector component with respect to the optical axis to thereby correct image blur caused due to fluctuation of the zoom lens.

15. A photographing apparatus according to claim 11, which satisfy the following condition:

$$-0.2 < (Ra+Rb)/(Ra-Rb) < 0.7$$

where the radius of curvature of a lens plane located closest to an image plane side within the first lens subunit is represented by Ra, and the radius of curvature of a lens plane located closest to the object side within the second lens subunit is represented by Rb.

16. A photographing apparatus according to claim 11, which satisfy the following conditions:

$$0.7 < F1/Fm < 2.8$$

$$0.15 < |F2/Fm| < 0.7$$

$$0.5 < F4/Fm < 2.0$$

where the focal length of an i-th lens unit of the lens units is represented by Fi.

* * * * *

UNITED STATES PATENT AND TRADEMARK OFFICE
CERTIFICATE OF CORRECTION

PATENT NO. : 6,462,885 B2  
DATED : October 8, 2002  
INVENTOR(S) : Akihiro Nishio It is certified that error appears in the above-identified patent and that said Letters Patent is hereby corrected as shown below:

Column 1,  
Lines 7 and 9, "fluctuation" should read -- a fluctuation --.  
Line 59, "correction a" should read -- a correction --.

Column 4,  
Line 31, "an" should read -- a --.

Column 7,  
Lines 7 and 40, "third second" should read -- third-second --.

Column 9,  
Line 33, "group," should read -- group --.  
Line 64, "the that" should read -- that --.

Column 10,  
Line 19, "meniscus-like," should read -- meniscus-like --.

Column 14,  
Line 39, "a imaging" should read -- an image --.  
Line 53, "cause" should read -- caused --.

Column 15,  
Lines 15, 30 and 40, "satisfy" should read -- satisfies --.

Column 16,  
Lines 20, 37 and 47, "satisfy" should read -- satisfies --.

Signed and Sealed this

Fifteenth Day of April, 2003

JAMES E. ROGAN  
*Director of the United States Patent and Trademark Office*

UNITED STATES PATENT AND TRADEMARK OFFICE
CERTIFICATE OF CORRECTION

PATENT NO. : 6,462,885 B2
DATED : October 8, 2002
INVENTOR(S) : Akihiro Nishio

It is certified that error appears in the above-identified patent and that said Letters Patent is hereby corrected as shown below:

<u>Title page,</u>
Item [*] Notice,
"[*] Notice:   Subject to any disclaimer, the term of this patent is extended or adjusted under 35 U.S.C. 154(b) by 33 days." should be deleted.

Signed and Sealed this

Seventeenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,462,885 B2
DATED : October 8, 2002
INVENTOR(S) : Nishio

It is certified that error appears in the above-identified patent and that said Letters Patent is hereby corrected as shown below:

Title page,
Item [*] Notice, delete the phrase "by 33 days" and insert -- by 0 days --

Signed and Sealed this

Twenty-eighth Day of September, 2004

JON W. DUDAS
Director of the United States Patent and Trademark Office